US007440136B2

(12) United States Patent
Matsuoka et al.

(10) Patent No.: US 7,440,136 B2
(45) Date of Patent: Oct. 21, 2008

(54) COLOR PROCESSING APPARATUS AND METHOD

(75) Inventors: Hirochika Matsuoka, Yokohama (JP); Suzuko Fukao, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 919 days.

(21) Appl. No.: 11/010,352

(22) Filed: Dec. 14, 2004

(65) Prior Publication Data

US 2005/0146736 A1 Jul. 7, 2005

(30) Foreign Application Priority Data

Dec. 15, 2003 (JP) ............... 2003-416616
Sep. 10, 2004 (JP) ............... 2004-264598

(51) Int. Cl.
*H04N 1/60* (2006.01)
*G06K 9/00* (2006.01)

(52) U.S. Cl. .................. 358/1.9; 358/518; 358/523; 358/527; 382/162; 382/167

(58) Field of Classification Search .............. 358/1.9, 358/500, 504, 515, 518, 520, 523, 527, 529; 382/162, 167; 345/442
See application file for complete search history.

(56) References Cited

U.S. PATENT DOCUMENTS

| 5,596,428 | A | 1/1997 | Tytgat et al. ............ 358/518 |
| 5,809,213 | A | 9/1998 | Bhattacharjya ............ 395/106 |
| 5,818,960 | A * | 10/1998 | Gregory et al. ............ 382/167 |
| 5,999,703 | A * | 12/1999 | Schwartz et al. ............ 358/1.9 |
| 6,229,626 | B1 * | 5/2001 | Boll ............ 358/1.9 |
| 6,897,988 | B1 | 5/2005 | Saito et al. ............ 358/515 |
| 2002/0054307 | A1 | 5/2002 | Matsuoka ............ 358/1.9 |
| 2002/0126302 | A1 | 9/2002 | Fukao ............ 358/1.9 |
| 2003/0076336 | A1 | 4/2003 | Fukao et al. ............ 345/589 |
| 2003/0081831 | A1 | 5/2003 | Fukao et al. ............ 382/167 |

FOREIGN PATENT DOCUMENTS

| JP | 08-056289 | 2/1996 |
| JP | 10-028231 | 1/1998 |
| JP | 10-324026 | 12/1998 |
| JP | 2002-033929 A | 1/2002 |

OTHER PUBLICATIONS

Stephens Rod, "Visual Basic" Image Processing Programming (3D version), Japan Softbank Corporation, Mar. 31, 1999, first edition, pp. 183-187 (in Japanese).

* cited by examiner

*Primary Examiner*—Edward L Coles
*Assistant Examiner*—Charlotte M Baker
(74) *Attorney, Agent, or Firm*—Fitzpatrick, Cella, Harper & Scinto

(57) ABSTRACT

When tetrahedral interpolation is used in correction of color reproduction upon color adjustment, image disturbances such as pseudo edges and the like may occur since the surfaces of each tetrahedron satisfy the boundary condition. Hence, a pixel position of digital image data is calculated, RGB values at that pixel position are acquired, and the acquired RGB values are displayed on RGB value display area. $L^*a^*b^*$ values are calculated based on basis functions and coefficient values of a color calculation B-spline solid, and the calculated $L^*a^*b^*$ values are displayed on an $L^*a^*b^*$ value display area.

14 Claims, 30 Drawing Sheets

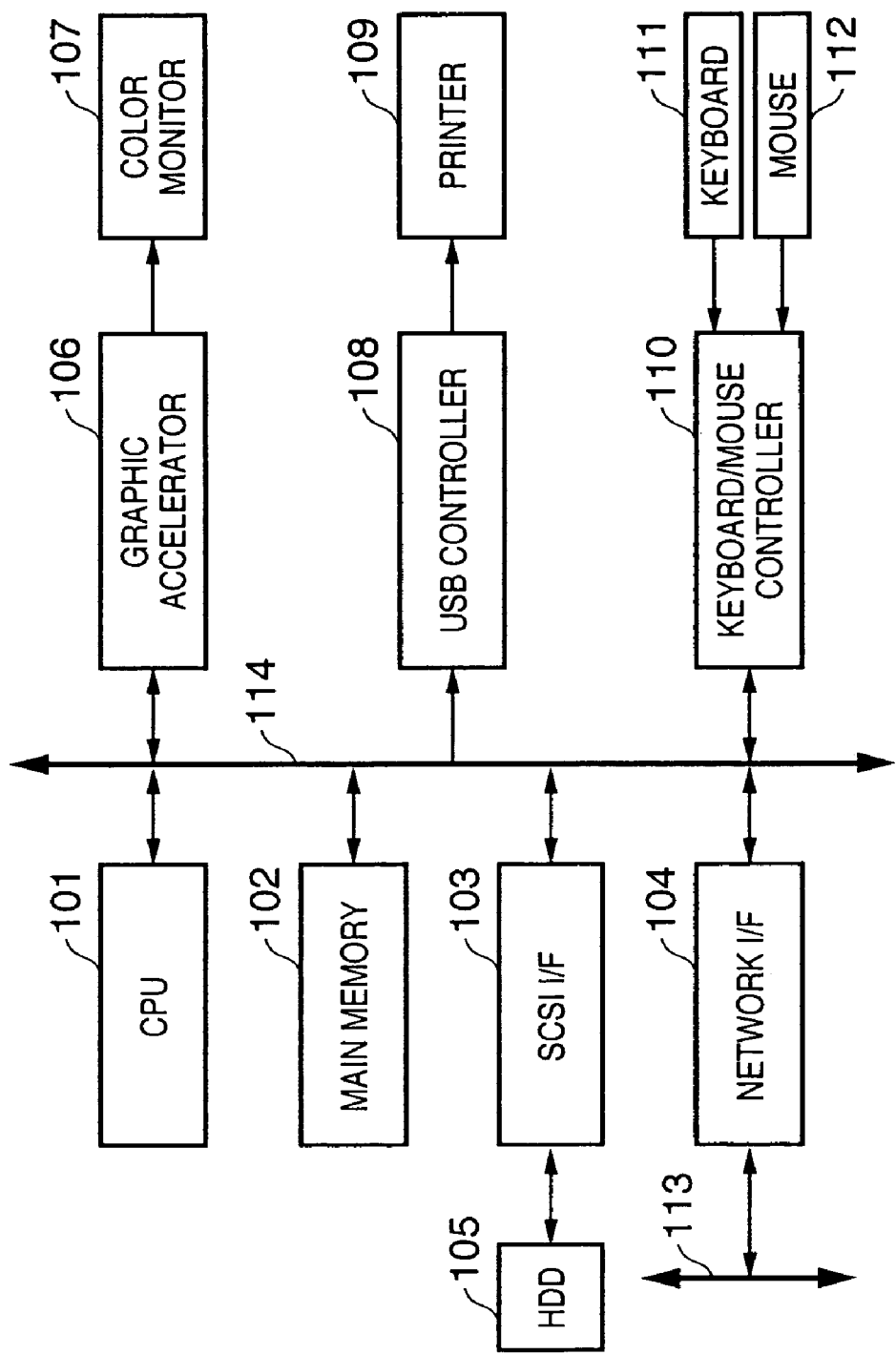

FIG. 6B

| R VALUE STEP : 0, 64, 128, 192, 255 |
|---|
| G VALUE STEP : 0, 64, 128, 192, 255 |
| B VALUE STEP : 0, 64, 128, 192, 255 |

L*a*b* VALUES OF Grid (0, 0, 0)
L*a*b* VALUES OF Grid (0, 0, 1)

⋮

L*a*b* VALUES OF Grid (0, 0, 4)
L*a*b* VALUES OF Grid (0, 1, 0)

⋮

L*a*b* VALUES OF Grid (4, 4, 3)
L*a*b* VALUES OF Grid (4, 4, 4)

F I G. 9
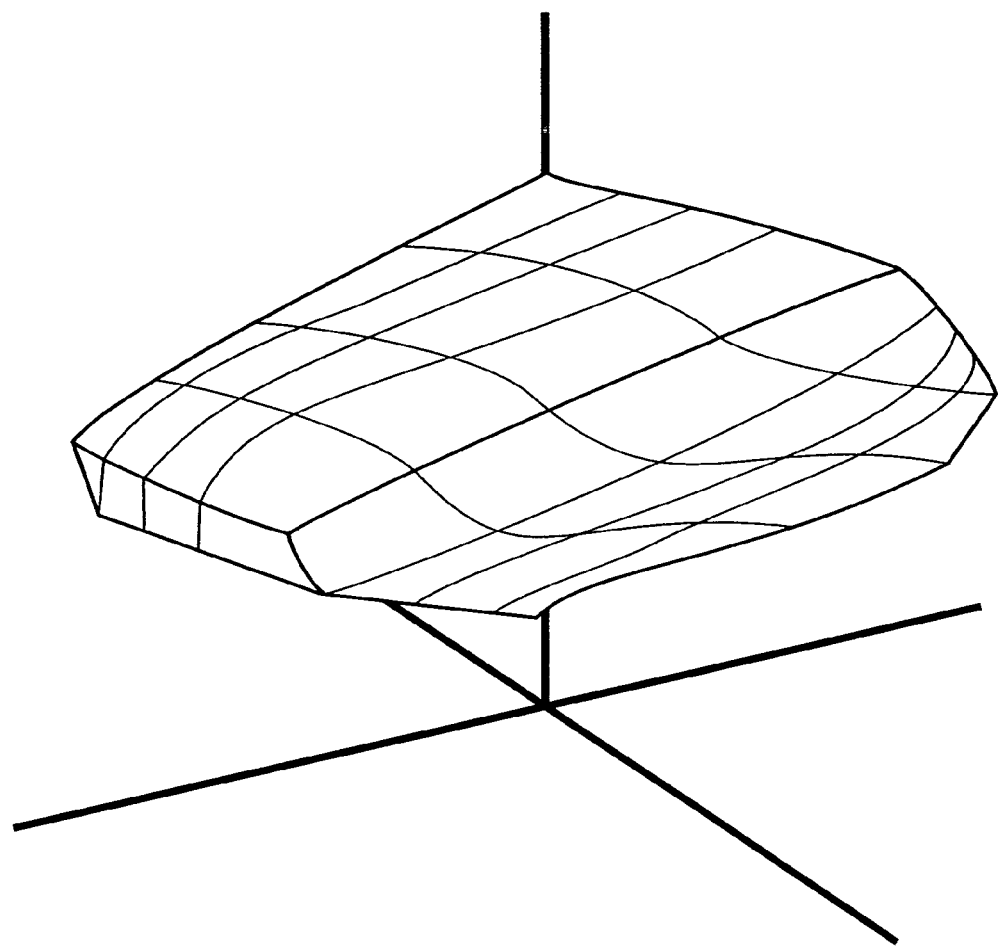

FIG. 14

| TOTAL NUMBER OF EDIT COLORS : 125 |
|---|
| EDIT COLOR DATA : <br>    RGB VALUES AND L*a*b* VALUES OF 1ST EDIT COLOR <br>    RGB VALUES AND L*a*b* VALUES OF 2ND EDIT COLOR <br>    ⋮ <br>    RGB VALUES AND L*a*b* VALUES OF n-TH EDIT COLOR <br>    ⋮ <br>    RGB VALUES AND L*a*b* VALUES OF 125TH EDIT COLOR |
| TOTAL NUMBER OF TRIANGLE PATCHES : 588 |
| COLOR GAMUT DATA : <br>    L*a*b* VALUES OF THREE VERTICES OF 1ST TRIANGLE PATCH <br>    ⋮ <br>    L*a*b* VALUES OF THREE VERTICES OF n-TH TRIANGLE PATCH <br>    ⋮ <br>    L*a*b* VALUES OF THREE VERTICES OF 588TH TRIANGLE PATCH |

FIG. 26

| TOTAL NUMBER OF PATCHES : 125 |
|---|

COLORIMETRY DATA :
    RGB VALUES AND L*a*b* VALUES OF 1ST PATCH
    RGB VALUES AND L*a*b* VALUES OF 2ND PATCH
    ⋮

RGB VALUES AND L*a*b* VALUES OF n-TH PATCH
    ⋮

RGB VALUES AND L*a*b* VALUES OF 125TH PATCH

FIG. 29

| R VALUE STEP : 0, 32, 64, 96, 128, 160, 192, 224, 255 |
|---|
| G VALUE STEP : 0, 32, 64, 96, 128, 160, 192, 224, 255 |
| B VALUE STEP : 0, 32, 64, 96, 128, 160, 192, 224, 255 |
| L*a*b* COLORIMETRIC VALUES FOR RGB(0, 0, 0)<br>L*a*b* COLORIMETRIC VALUES FOR RGB(0, 0, 32)<br>⋮<br>L*a*b* COLORIMETRIC VALUES FOR RGB(0, 0, 255)<br>L*a*b* COLORIMETRIC VALUES FOR RGB(0, 32, 0)<br>⋮<br>L*a*b* COLORIMETRIC VALUES FOR RGB(255, 255, 255)<br>L*a*b* COLORIMETRIC VALUES FOR RGB(255, 255, 255) |

COLOR PROCESSING APPARATUS AND METHOD

FIELD OF THE INVENTION

The present invention relates to a color processing apparatus and method and, more particularly, to a color process for calculating color signal values of a second colorimetric system from those expressed by a first colorimetric system and, and a calculation and prediction of color signal values required to create a profile.

BACKGROUND OF THE INVENTION

In recent years, along with the popularization of personal computers and workstations, desktop publishing (DTP) and digital image management are prevalently used. In a computer system having a DTP color monitor and color printer, a color image is created, edited, processed, and so forth on the monitor, an output image is checked by displaying a preview, and the color image is output via the color printer. Also, an image sensed by a digital camera is displayed on the color monitor or is output via the color printer after color adjustment. In such image processing field, various color calculation methods are used for an intended purpose in order to realize a desired color process.

In the preview process of a print output in DTP, L*a*b* values that express color reproduction upon printing an RGB image are calculated based on a color profile of a printer and, for example, sRGB value are calculated from the L*a*b* values to display a preview image on the monitor. Note that the color profile of the printer normally uses a lookup table (LUT). Upon calculating L*a*b* values using this LUT, tetrahedral interpolation that performs linear interpolation calculations in a small region bounded by four points is popularly used. Especially, the tetrahedral interpolation using an LUT divides a hexahedral region bounded by eight neighboring colors into six tetrahedral regions, and makes linear interpolation calculations for respective regions. FIG. 1 illustrates division into six tetrahedral regions.

Color adjustment of a digital camera image corrects color reproduction so that surrounding colors of an adjustment color change upon adjusting a given color. There are many methods for correcting color reproduction. As a typical method, a method of changing RGB halftone characteristics is known. However, such method cannot limit correction of color reproduction to a local region. As an advanced correction method, a method using gamut mapping is used. According to this method, color reproduction can be corrected by changing mapping parameters as in a technique disclosed in, e.g., Japanese Patent Laid-Open No. 2002-33929. As another correction method, a method of expressing color reproduction by approximation using a plurality of representative colors, and implementing correction by combining changes of these representative colors and tetrahedral interpolation using the representative colors is known. According to this method, color reproduction can be corrected by limiting the range of influence to only a tetrahedral region including an adjustment color.

However, when tetrahedral interpolation is used, an image disturbance often occurs due to switching of linear interpolations to have the tetrahedron surface as a boundary. For example, in the preview process of a print output, image disturbances such as a decrease in preview display precision due to a decrease in L*a*b* value calculation precision resulting from switching of linear interpolations, generation of pseudo edges, and the like may occur. Especially, when the grid intervals of an LUT are coarse, values change abruptly to have the surfaces of tetrahedrons as boundaries and pronounced image disturbances are prone to occur.

When the tetrahedral interpolation is used in correction of color reproduction upon color adjustment, image disturbances such as pseudo edges and the like may occur since the surfaces of each tetrahedron satisfy the boundary condition. When the rate of change of lightness varies to have the surface of a tetrahedron as a boundary, a smooth halftone change of a gradation image or the like is lost. If the rate of change varies abruptly, image disturbances such as pseudo edges and the like appear more conspicuously.

When gamut mapping is to be made in correction of color reproduction upon color adjustment, it is difficult to directly designate a color after adjustment. For example, according to a popular mapping method that performs compression mapping to have one point on the L-axis as a target point, a change in color becomes steep near the gamut boundary, and image disturbances such as pseudo edges and the like may occur. FIGS. 2A and 2B show a state wherein a change in color becomes steep near the gamut boundary. In FIG. 2A, the one-dashed chain line indicates the monitor color reproduction. In FIG. 2B, the solid curve indicates the printer color reproduction after mapping, and the dotted curve indicates the printer gamut.

In the aforementioned fields such as DTP, CAD, and the like, a color prediction technique that predicts an actual physical stimulus value upon printing or displaying a digital image is indispensable.

As a technique required for this color prediction technique, for example, color management is known. For example, when a color image is created, edited, processed, and so forth on a color monitor and is output via a color printer, it is required to attain perceptual matching between the color image on the monitor and the output image of the printer independently of the color characteristics of the monitor and printer. As an example of a technique that implements color management which meets such requirement, the Color Management System (CMS) that performs color management based on ICC color profiles, which are specified based by ICC (International Color Consortium), is known.

The CMS defines a device-independent hub color space or Profile Connection Space (PCS), and implements color management using a source profile that specifies color conversion from a device color space to the hub color space (or PCS) and a destination profile that specifies color conversion from the hub color space (PCS) to the device color space on that color space.

A processing system includes two major conversion processes: a process for converting an input color signal value on a device color space depending on an input device into a color signal value on the hub color space (or PCS) using the source profile, and a process for converting that color signal value into an output color signal of a device color space suited to an output device using the destination profile. This system can flexibly support various kinds of color matching such as color matching from a scanner to a printer, that from a monitor to a printer, and the like. For example, when a monitor profile is designated as the source profile and a printer profile is designated as the destination profile in a DTP system, perceptual matching between a color image on the monitor and an output image of the printer can be realized.

Since the quality of perceptual matching depends on profiles, profiles that associate colors depending on devices and those on the hub color space or PCS as precisely as possible must be prepared. For this purpose, color prediction that predicts a physical stimulus value upon actually printing or displaying a device-dependent color must be precisely executed.

As such color prediction technique, a table type color prediction technique that uses colorimetric values of patches and linear interpolation is available. As the linear interpolation, various interpolation methods such as tetrahedral interpolation, cubic interpolation, triangular prism interpolation, and the like have been proposed. However, the prediction precision of these interpolation methods depends on the grid density of a table. For this reason, when high precision is required, the number of grids must be increased to perform colorimetry processes of a very large number of patches, thus requiring a lot of labor.

SUMMARY OF THE INVENTION

The first aspect of the present invention discloses a technique for calculating a color signal value of a second colorimetric system using multiple summation calculations including as basis functions piecewise polynomials having the same multiplicity as the number of dimensions of a first colorimetric system upon calculating a color signal value of the second colorimetric system from that expressed by the first colorimetric system.

With this arrangement, colors can be calculated to have a smooth change that reflects a color change trend upon correcting color reproduction.

The second aspect of the present invention discloses a technique for designating values after color correction, calculating color reproduction in accordance with the values after correction, and generating data used to virtually three-dimensionally display a change in color reproduction in accordance with the calculation result of the color reproduction.

With this arrangement, a color adjustment interface that can be easily controlled by the user can be provided.

The third aspect of the present invention discloses a technique for setting conversion formulas based on multiple summation calculations including as basis functions piecewise polynomials having the same multiplicity as the number of dimensions of a first colorimetric system, calculating coefficients of the piecewise polynomials corresponding to conversion formulas that approximate a sequence of combinations or conversion formulas that smooth a curve set, polygon set, or super-polygon set that connects the combinations on the basis of data that specifies combinations of a plurality of color signal values expressed by the first colorimetric system and those of a second colorimetric system to be calculated in correspondence with these color signal values, and calculating a color signal value of the second colorimetric system corresponding to that expressed by the first colorimetric system using the multiple summation calculations upon calculating a color signal value of a predetermined colorimetric system.

With this arrangement, occurrence of oscillation (see FIG. 23A) can be suppressed upon determining coefficient values of the basis functions to pass a predetermined color coordinate value.

The fourth aspect of the present invention discloses a technique for setting multiple summation calculations including as basis functions piecewise polynomials having the same multiplicity as the number of dimensions of a first colorimetric system, calculating coefficients of the piecewise polynomials on the basis of data indicating combinations of a plurality of color signal values expressed by the first colorimetric system and those of a second colorimetric system as colorimetry results of these color signal values, and calculating a plurality of color signal values of the second colorimetric system corresponding to the plurality of color signal values expressed by the first colorimetric system using the multiple summation calculations.

With this arrangement, color signal values can be precisely predicted from colorimetry results of a small number of patches.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a block diagram showing the arrangement of a color processing apparatus;

FIG. 6B is a view for explaining the data structure of a profile;

FIG. 9 shows a state wherein the calculation result of the B-spline solid is expressed as a distribution on an L*a*b* space;

FIG. 14 is a view for explaining the data structure of color edit data;

FIG. 26 shows the data format as combinations of L*a*b* and RGB values of colorimetry data;

FIG. 29 shows the data structure of a profile.

DESCRIPTION OF THE PREFERRED EMBODIMENTS

Figure 1:
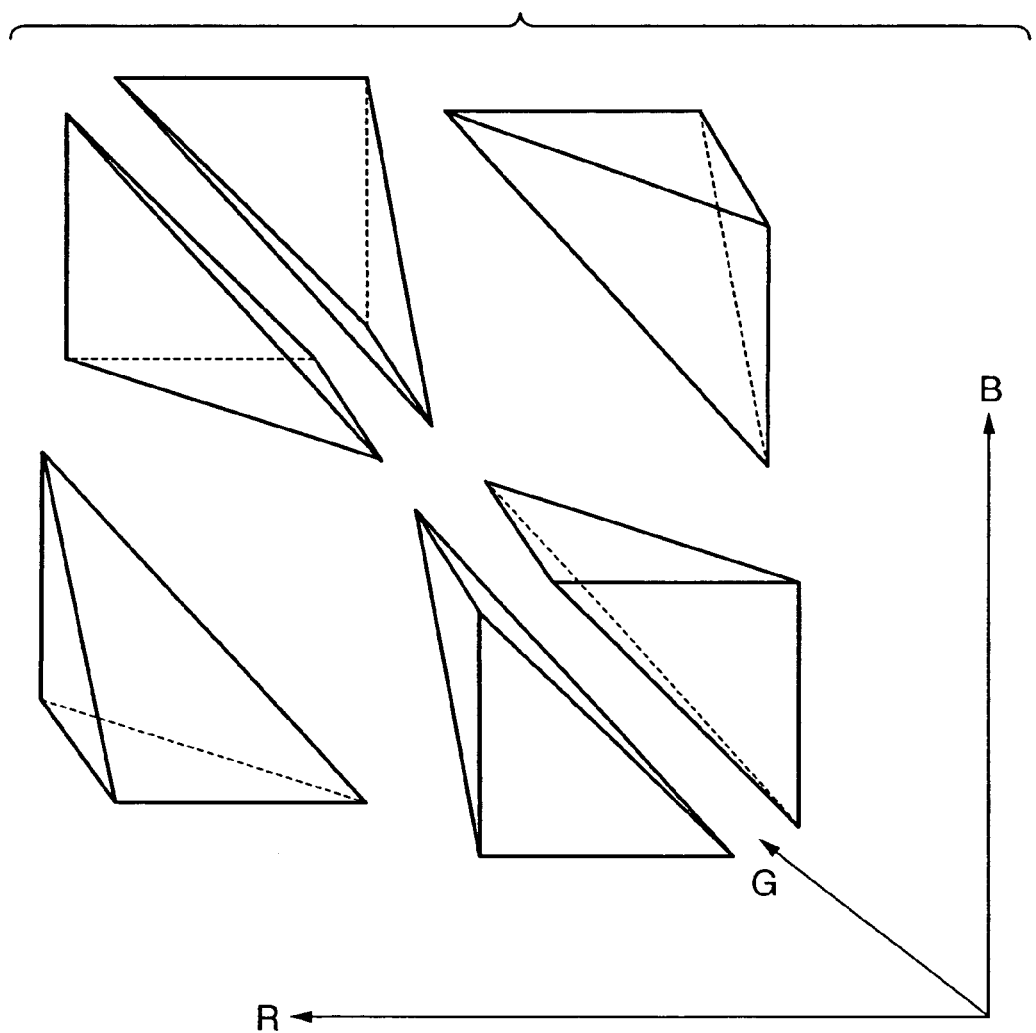
FIG. 1 illustrates division into six tetrahedrons.
Figure 2A:
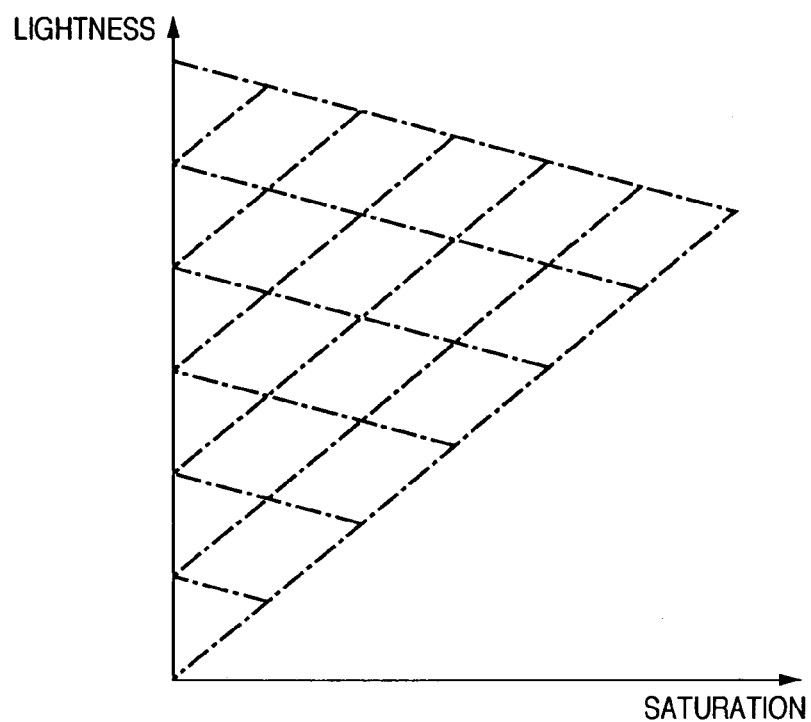
FIGS. 2A and 2B are views showing a state wherein a change in color becomes steep near the gamut boundary.
Figure 2B:
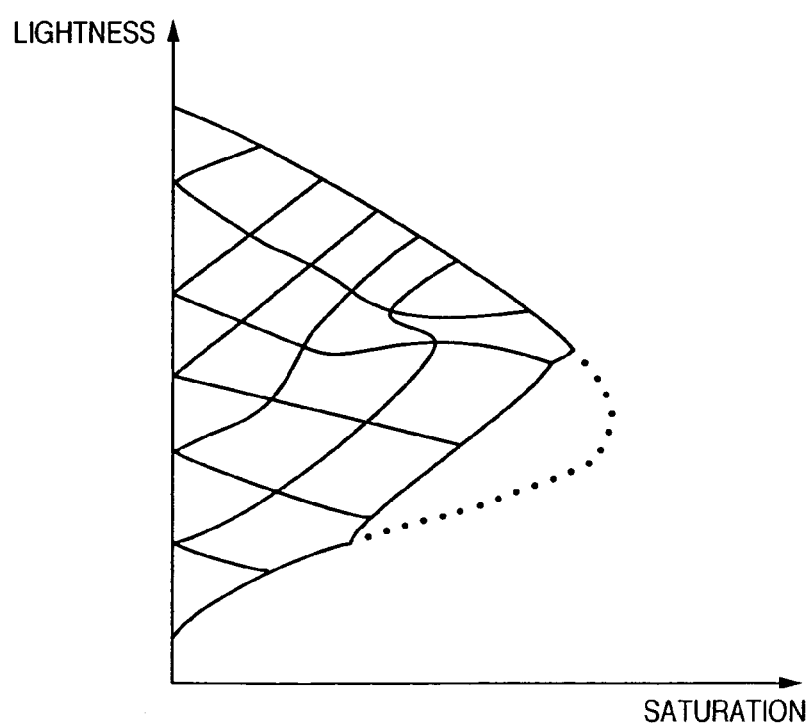

An image process according to preferred embodiments of the present invention will be described in detail hereinafter with reference to the accompanying drawings.

First Embodiment

[Arrangement]

FIG. 3 is a block diagram showing an example of the arrangement of a color processing apparatus according to the first embodiment.

Referring to FIG. 3, a CPU 101 executes various processes and control to be described later by controlling components to be described later via a system bus (and PCI bus) 114 in accordance with programs stored in a main memory 102 including a ROM and RAM and hard disk drive (HDD) 105 using the main memory 102 as a work memory.

A general-purpose parallel interface (I/F) 103 such as Small Computer Standard Interface (SCSI) interfaces the HDD 105 with the system bus 114. A graphic accelerator 106 interfaces a color monitor 107 with the system bus 114. A USB controller 108 interfaces a color printer 109 with the system bus 114. A keyboard/mouse controller 110 interfaces input devices such as a keyboard 111, mouse 112, and the like with the system bus 114. Note that a serial bus interface such as the USB controller 108, IEEE1394, and the like may interface the HDD 105, keyboard 111, and mouse 112 with the system bus 114 in place of the SCSI I/F 103, keyboard/mouse controller 110, and the like. A network interface (I/F) 104 interfaces a local area network (LAN) 113 with the system bus.

[Preview Operation]

Figure 4:
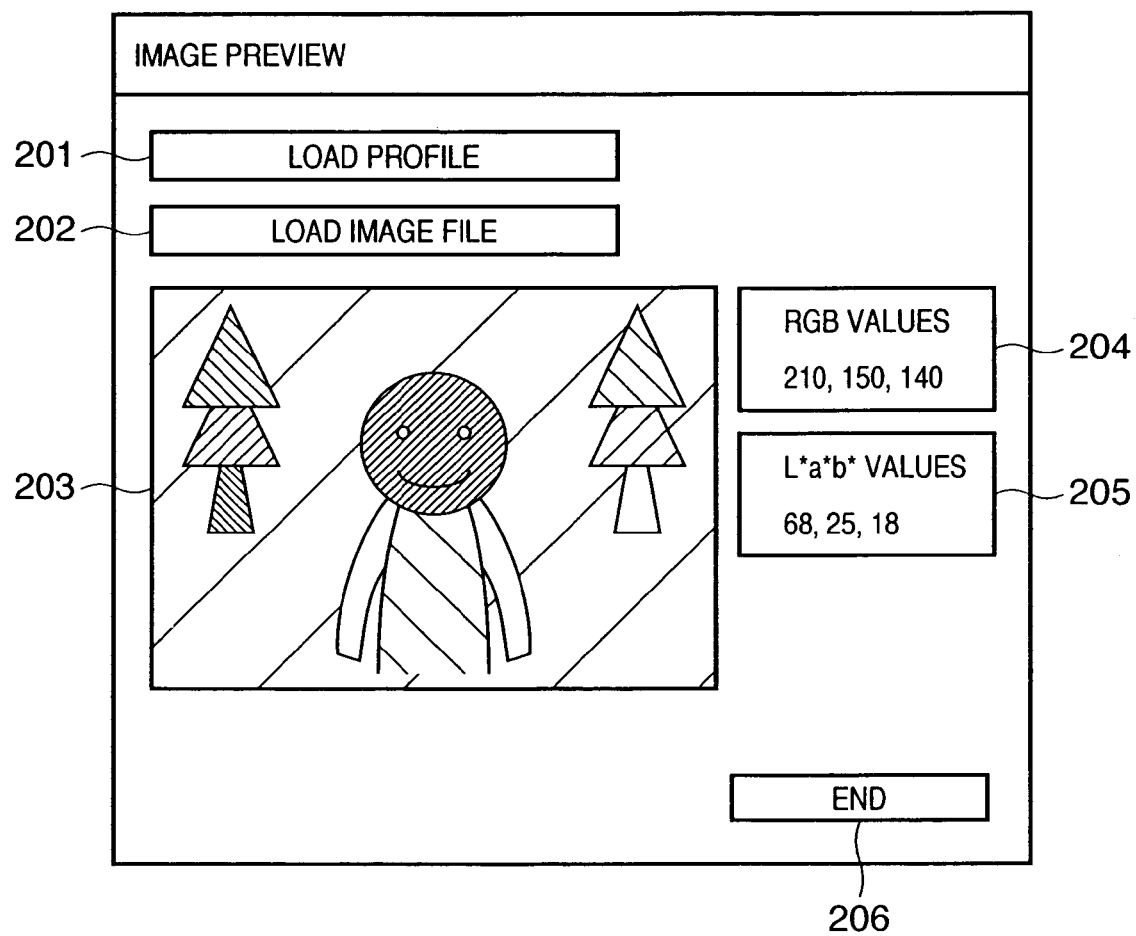
FIG. 4 shows a user interface used upon displaying a preview.

A print image preview operation in the above arrangement will be explained below. FIG. 4 shows a user interface used upon displaying a preview image.

An image preview application stored in the HDD 105 is launched in response to a command from the CPU 101. Next, a default profile and default digital image data stored in the HDD 115 are transferred to the main memory 102 via the SCSI I/F 103 and system bus 114 on the basis of a command from the CPU 101 in accordance with the process of the image preview application. The CPU 101 displays a window shown in FIG. 4 on the color monitor 107. The user confirms color reproduction of a print image using an image preview 203 and L*a*b* value display 205 in the displayed window.

The window shown in FIG. 4 includes a button 201 used to issue a load instruction of a profile, a button 202 used to load an image file for preview display, the image preview display area 203, an RGB value display area 204, the L*a*b* value display area 205, and application end button 206.

When the user issues an image load instruction by, e.g., clicking (or pressing) the image file load button 202 by the mouse 112 or the like, digital image data stored in the HDD 115 is transferred to the main memory 102 via the SCSI I/F 103 and system bus 114 on the basis of a command from the CPU 101 in accordance with the process of the image preview application. Or digital image data stored in a server connected to the LAN 113 or that on the Internet is transferred to the main memory 102 via the network I/F 104 and system bus 114 on the basis of a command from the CPU 101. The digital image data stored in the main memory 102 is processed accordingly, and is stored in the main memory 102 as preview display image data. Also, the digital image data is displayed on the display area 203.

When the user instructs to load a profile by clicking the profile load button 201 by, e.g., the mouse 112, the designated profile is loaded from the HDD 105 or via the network in accordance with the process of the image preview application. The loaded profile is used to process digital image data stored in the main memory 102 accordingly to generate preview display image data. The preview display image data is stored in the main memory 102, and is displayed on the display area 203.

Furthermore, when the user clicks an arbitrary position of the display area 203 to confirm color reproduction, the image preview application acquires an RGB value of a pixel corresponding to the clicked position from the digital image data stored in the main memory 102, calculates L*a*b* values by a color calculation process (to be described later), and displays the RGB values on the RGB value display area 204 and the L*a*b* values on the L*a*b* value display area 205.

When the user clicks the end button 206 by the mouse 112 or the like, the image preview application releases the storage areas and work area for the digital image data and preview display image data on the main memory 112, thus ending the process.

[Operation of Image Preview Application]

Figure 5:
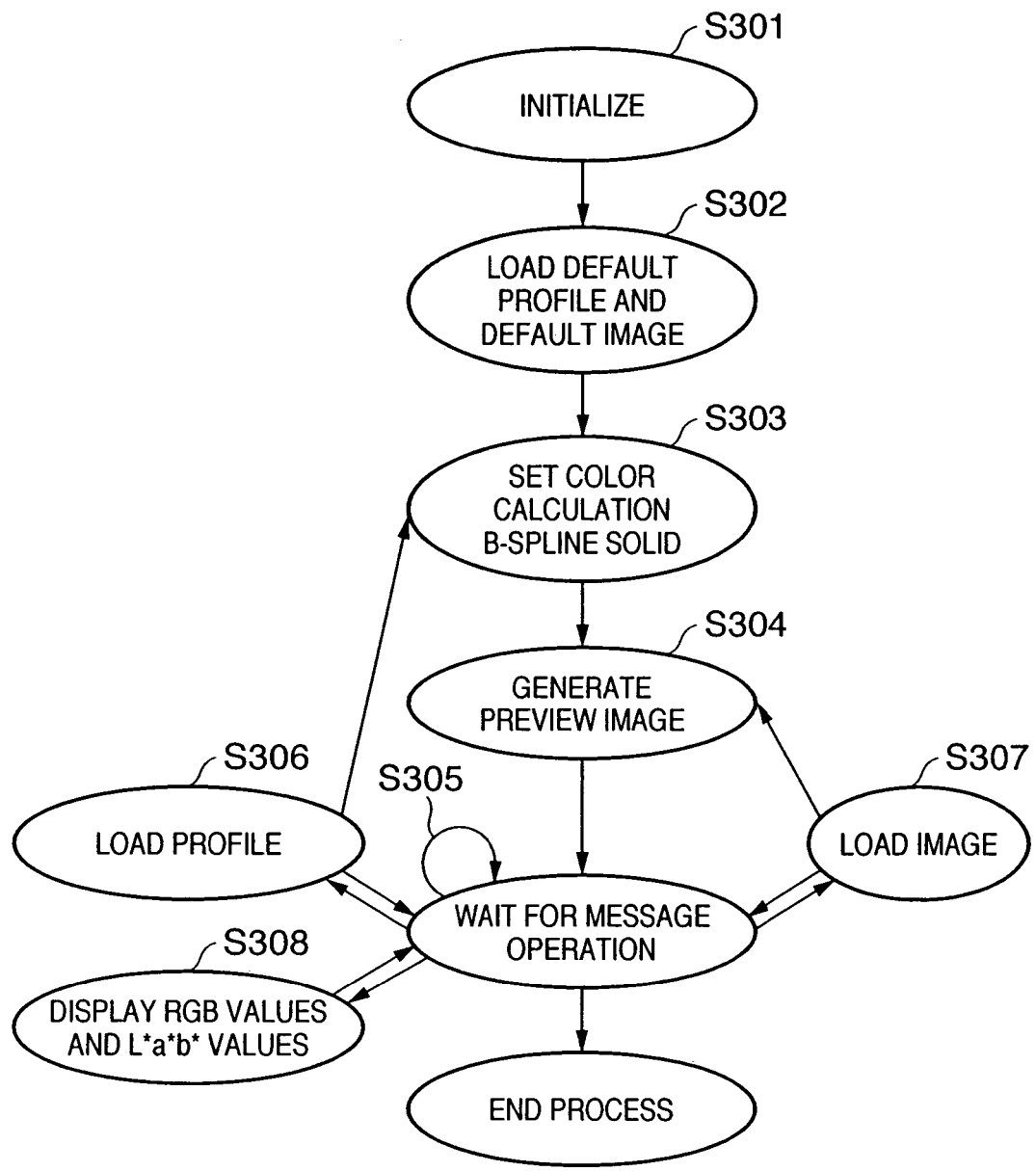
FIG. 5 is a status transition chart for explaining the operation of an image preview application.

FIG. 5 is a status transition chart for explaining the operation of the image preview application.

Figure 6A:
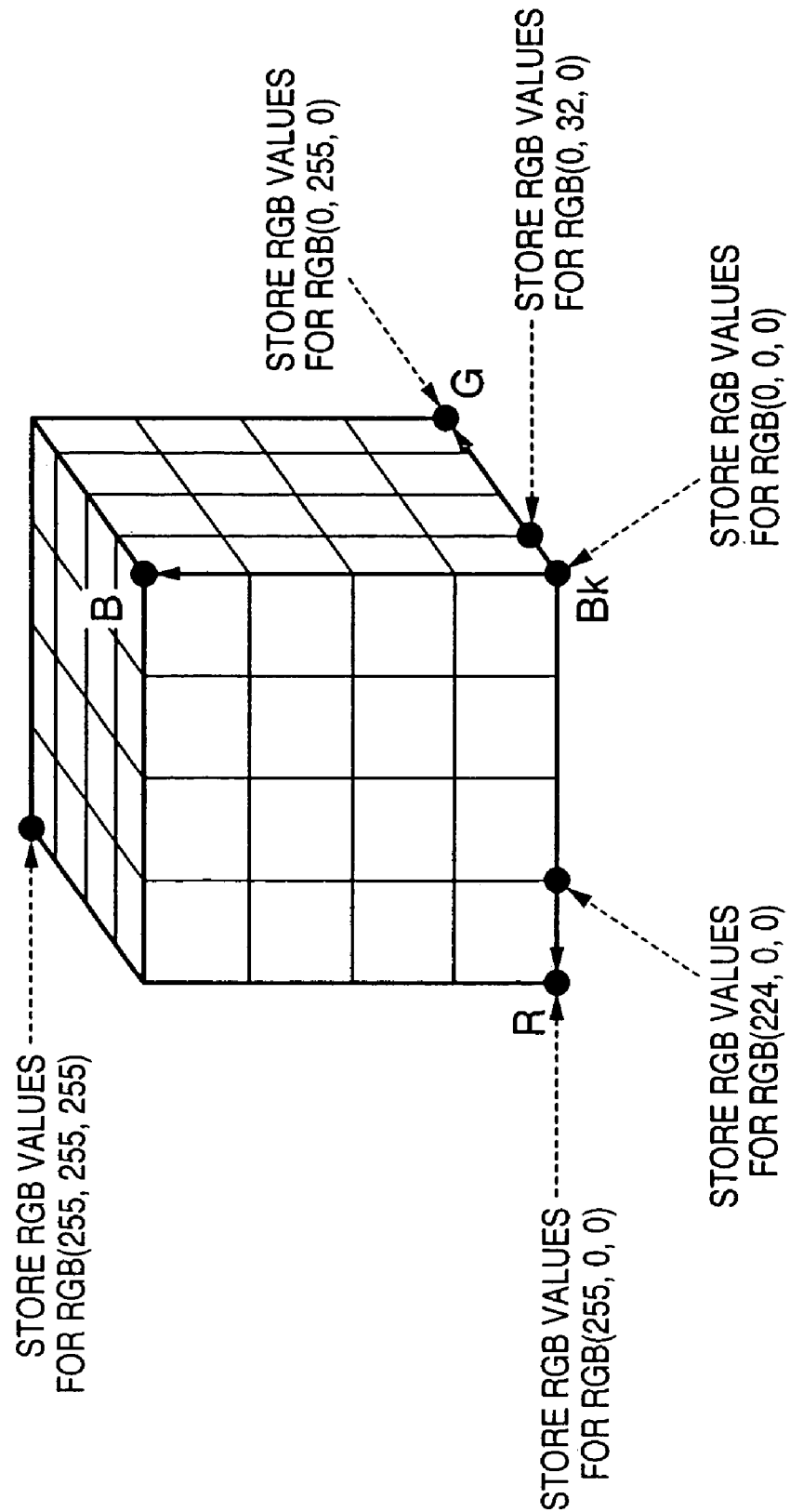
FIG. 6A depicts the data structure of a profile on an RGB color space.

An initialization process (e.g., assurance of various memory areas required for operations, and the like) is executed (S301), and a default digital image file and default profile as a color calculation profile are loaded from the HDD 105 and are stored in the main memory 102 (S302). Note that digital image data held on the main memory 102 will be explained as image data whose R, G, and B color signals are respectively expressed by signless 8 bits. The profile has the data structure shown in FIG. 6B, which describes correspondence between the color coordinate steps of grid points of the RGB color space, and coordinate values of the L*a*b* color space reproduced by the grid points. The profile describes steps of R/G/B values at the beginning, and then describes L*a*b* color coordinates which are nested in the order of R, G, and B. FIG. 6A depicts the data structure of the profile on the RGB color space.

Next, coefficients and basis functions for a color calculation B-spline solid are calculated by a process to be described later using the stored profile (S303). The digital image data which is stored using the color calculation B-spline solid is converted into preview image data, and the converted image data is displayed on the display area 203 (S304), thus waiting for a user's operation (S305).

If the profile load button 201 is pressed in the user's operation waiting state (S305), a dialog that prompts the user to designate a profile to be loaded is displayed. After a profile to be loaded is designated, it is checked if that profile can be opened. If the profile can be opened, the profile is loaded and stored in the main memory 102, and it is checked if the format of the profile is correct (S306). If the profile can be opened and has a correct format, the flow advances to step S303; if the profile cannot be opened or has an illegal format, a message that advises accordingly is displayed, and the flow returns to step S305.

On the other hand, if the image file load button 202 is pressed, a dialog that prompts the user to designate an image file to be loaded. After an image file to be loaded is designated, it is checked if that image file can be opened. If the image file can be opened, the image file is loaded and stored in the main memory 102, and it is checked if the image file has a correct format (S307). If the image file can be opened and has a correct format, the flow advances to step S304; if the file cannot be opened or has an illegal format, a message that advises accordingly is displayed, and the flow returns to step S305.

If the mouse button is clicked on the display area 203, the position of the mouse pointer on the display area 203 is stored. After that, RGB values of a pixel corresponding to the mouse pointer position are displayed on the RGB value display area 204, and L*a*b* values used upon printing that RGB value are displayed on the L*a*b* value display area 205 (S308). The flow then returns to step S305.

If the end button 206 is pressed, the end operation (for releasing memory areas and the like) is done, thus ending the image preview application.

[Setting of Color Calculation B-Spline Solid (S303)]

The color calculation B-spline solid is defined by multiple summation formulas including the following piecewise polynomials as a basis function:

$$\lambda = \Sigma_i \Sigma_j \Sigma_k c\lambda_{ijk} N_{ri}(rr) N_{gj}(gg) N_{bk}(bb)$$

$$a = \Sigma_i \Sigma_j \Sigma_k ca_{ijk} N_{ri}(rr) N_{gj}(gg) N_{bk}(bb)$$

$$b = \Sigma_i \Sigma_j \Sigma_k cb_{ijk} N_{ri}(rr) N_{gj}(gg) N_{bk}(bb) \quad (1)$$

where rr, gg, and bb are RGB values, $\lambda$, a, and b are L*a*b* values, $N_r$ is the basis function in the R-axis direction, $N_g$ is the basis function in the G-axis direction, and $N_b$ is the basis function in the B-axis direction, $c\lambda_{ijk}$, $ca_{ijk}$, and $cb_{ijk}$ are coefficients, and suffixes i, j, and k appended to $N_r$, $N_g$, and $N_b$ are respectively the basis function numbers in bases for respective axes.

Figure 7:
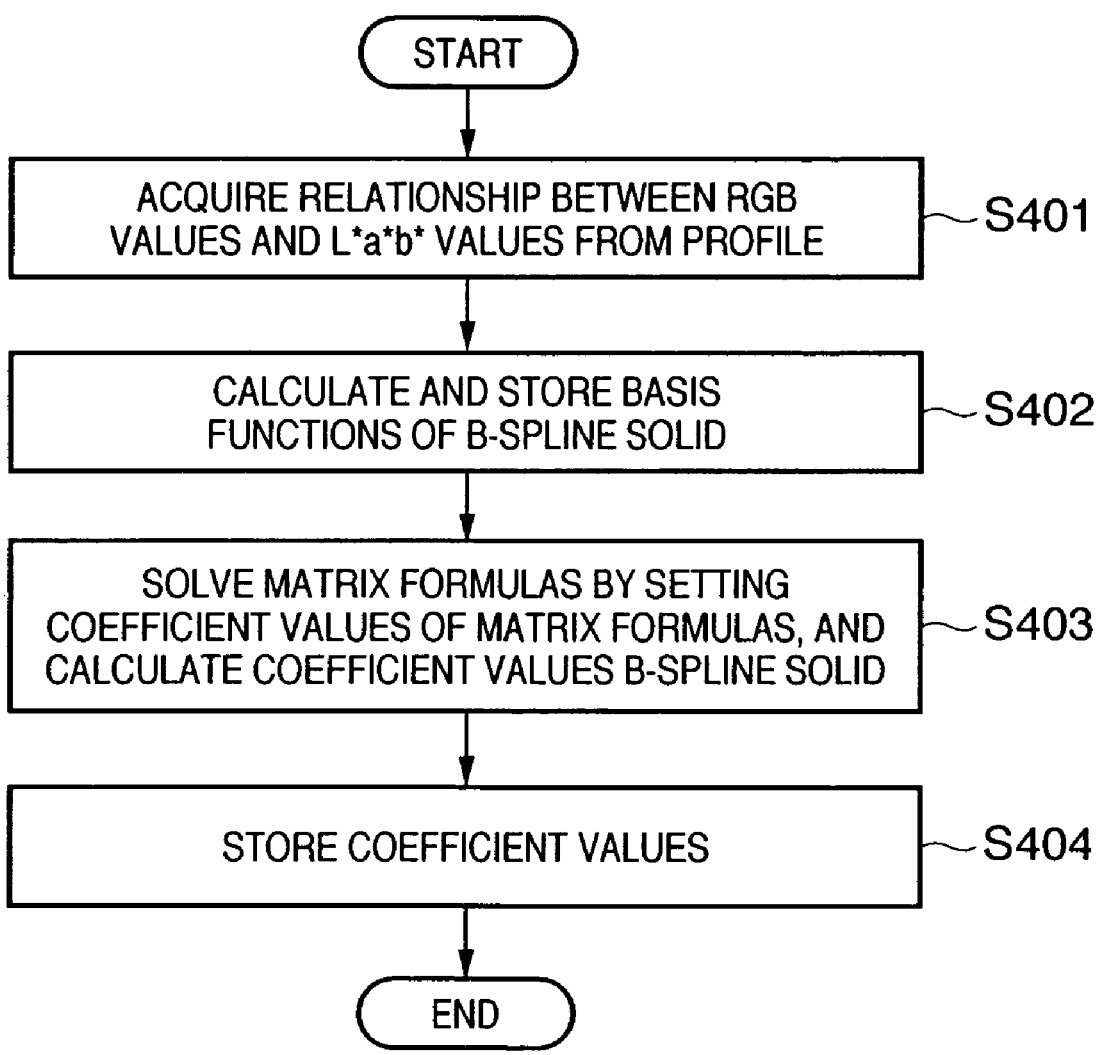
FIG. 7 is a flowchart for explaining a calculation process of coefficients and basis functions of a color calculation B-spline solid.

FIG. 7 is a flowchart for explaining the coefficients and basis functions of the color calculation B-spline solid.

The correspondence between the RGB values and L*a*b* values is acquired from the profile expressed by the data structure shown in FIG. 6B (S401). The RGB values are calculated according to the nest order and step values of R/G/B values, and the L*a*b* values are those which are described in the profile. As the correspondence between the RGB values and L*a*b* values, i-th RGB values=$rr_i$, $gg_i$, and $bb_i$, and i-th L*a*b* values=$\lambda_i$, $a_i$, and $b_i$ will be used.

Figure 8:
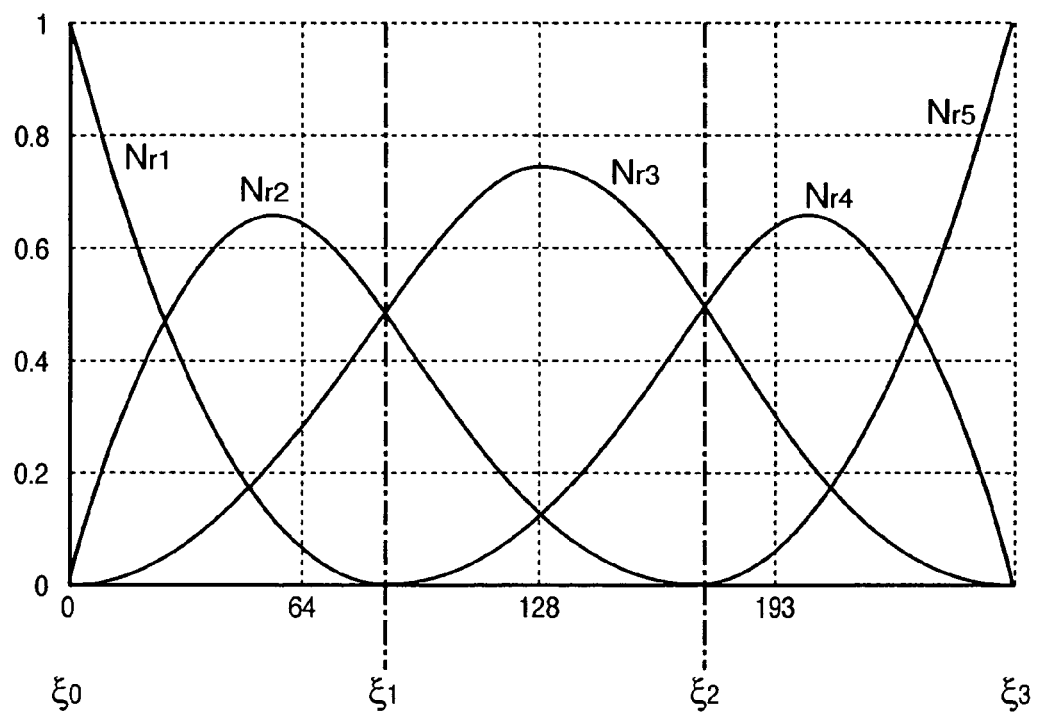
FIG. 8 shows a basis function $N_r$ of the R-axis.

The basis functions are calculated based on the steps of R/G/B values from the profile expressed by the data structure shown in FIG. 6B, and are stored in the main memory 102 (S402). The calculations of the basis functions use a general DeBoor-Cox algorithm. If the steps of R/G/B values are equal to each other, as shown in FIG. 6B, and if each of the basis functions $N_r$, $N_g$, and $N_b$ is a B-spline basis of degree 3, it becomes a basis function of four knots $\xi 0$ to $\xi 3$, as shown in FIG. 8. Note that FIG. 8 shows the basis function $N_r$ of the R-axis. The basis function will be explained as a B-spline basis of degree 3 hereinafter.

Using the calculated basis functions and the acquired correspondence between the RGB values and L*a*b* values, a matrix formula f=MC is solved using LUT decomposition for each of $\lambda^*$, $a^*$, and $b^*$ components to calculate coefficients. Coefficient calculations using the formula will be described in detail below.

A component $m_{st}$ at the s-th row and t-th column of a matrix M is calculated by:

$$m_{st} = N_{ri}(rr_s) N_{gj}(gg_s) N_{bk}(bb_s) \quad (2)$$

for t=25(i−1)+5(j−1)+k where i, j, and k are integers ranging from 1 to 5.

Note that the relationship between t and i, j, and k changes depending on the number of knots and the degree of the basis function. For example, in case of the B-spline basis of degree 3 having six knots, we have t=49(i−1)+7(j−1)+k.

Calculations of the coefficients $c\lambda_{ijk}$, $ca_{ijk}$, and $cb_{ijk}$ will be described below. In order to calculate the coefficient $c\lambda_{ijk}$, the following matrix formulas are solved using LUT decomposition:

$$f\lambda = [\lambda_1, \lambda_2, \ldots, \lambda_{125}]$$

$$c\lambda = [c\lambda_{111}, c\lambda_{112}, \ldots, c\lambda_{115}, c\lambda_{121}, \ldots c\lambda_{155}, c\lambda_{211}, \ldots, c\lambda_{554}, c\lambda_{555}]$$

$$f\lambda = M \cdot c\lambda \quad (3)$$

In order to calculate the coefficient $ca_{ijk}$, the following matrix formulas are solved using LUT decomposition:

$$fa = [a_1, a_2, \ldots, a_{125}]$$

$$ca = [ca_{111}, ca_{112}, \ldots, ca_{115}, ca_{121}, \ldots ca_{155}, ca_{211}, \ldots, ca_{554}, ca_{555}]$$

$$fa = M \cdot ca \quad (4)$$

In order to calculate the coefficient $cb_{ijk}$, the following matrix formulas are solved using LUT decomposition:

$$fb = [b_1, b_2, \ldots, b_{125}]$$

$$cb = [cb_{111}, cb_{112}, \ldots, cb_{115}, cb_{121}, \ldots cb_{155}, cb_{211}, \ldots, cb_{554}, cb_{555}]$$

$$fb = M \cdot cb \quad (5)$$

The calculated coefficients are stored in the main memory 102 (S404).

Using the B-spline solid calculated in this way, changes of L*a*b* values with respect to RGB values can be smoothly expressed, as shown in FIG. 9. FIG. 9 shows the calculation result of the B-spline solid as the distribution on the L*a*b* space. Lines other than axes shown in FIG. 9 indicate paths of L*a*b* values upon changing one of RGB values.

[Display of RGB values and L*a*b* Values (S308)]

Figure 10:
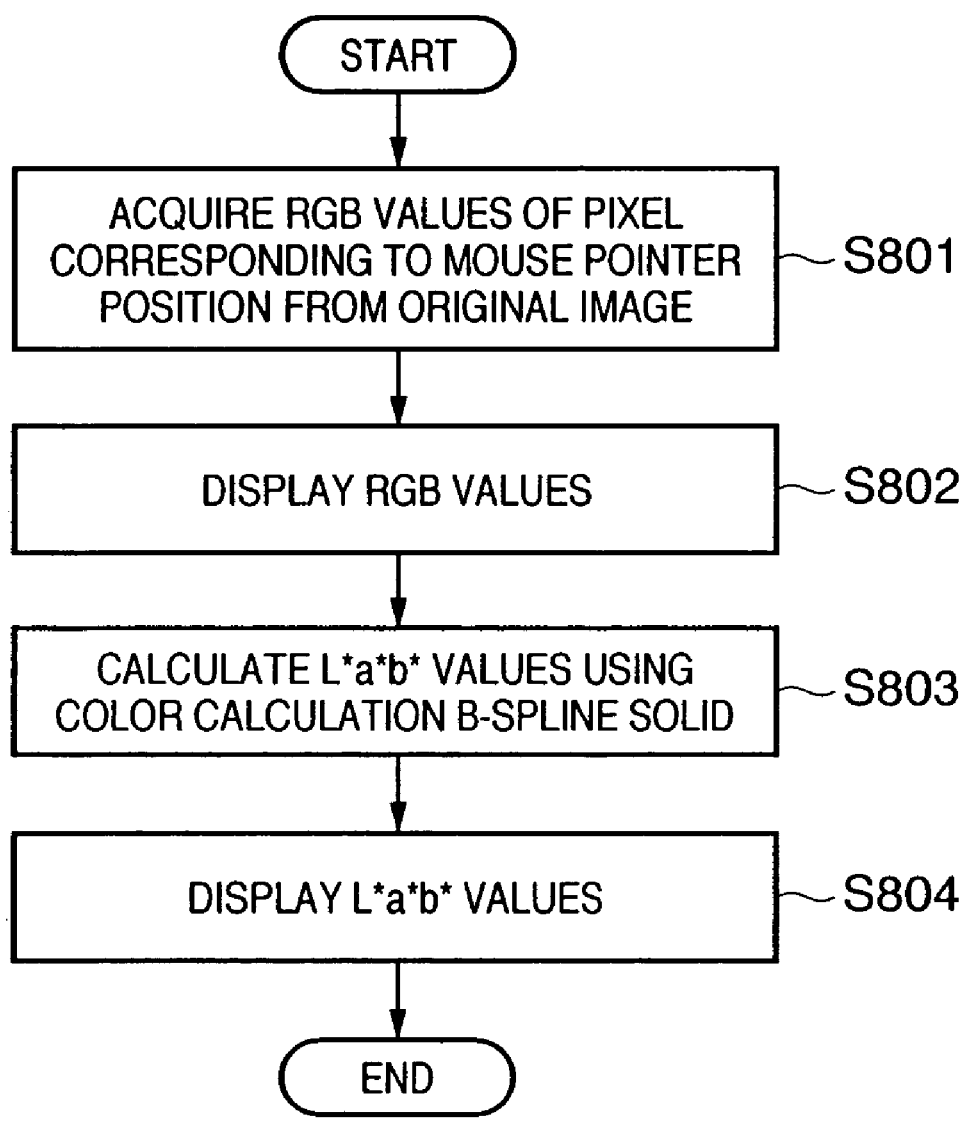
FIG. 10 is a flowchart for explaining a display process of RGB and L*a*b* values at a designated image position.

FIG. 10 is a flowchart for explaining the display process of the RGB values and L*a*b* values at a designated image position.

A pixel position of digital image data corresponding to the mouse pointer position is calculated, RGB values at that pixel position are acquired (S801), and the acquired RGB values are displayed on the RGB value display area 204 (S802). The basis functions and coefficient values of the color calculation B-spline solid are acquired from the main memory 102, and L*a*b* values are calculated (S803) by:

$$\lambda = \Sigma_i^5 \Sigma_j^5 \Sigma_k^5 c\lambda_{ijk} N_{ri}(rr) N_{gj}(gg) N_{bk}(bb)$$

$$a = \Sigma_i^5 \Sigma_j^5 \Sigma_k^5 ca_{ijk} N_{ri}(rr) N_{gj}(gg) N_{bk}(bb)$$

$$b = \Sigma_i^5 \Sigma_j^5 \Sigma_k^5 cb_{ijk} N_{ri}(rr) N_{gj}(gg) N_{bk}(bb) \quad (6)$$

where rr, gg, and bb are RGB values, and λ, a, and b are L*a*b* values.

The calculated L*a*b* values are displayed on the L*a*b* value display area 205 (S804).

[Generation of Preview Image (S304)]

Figure 11:
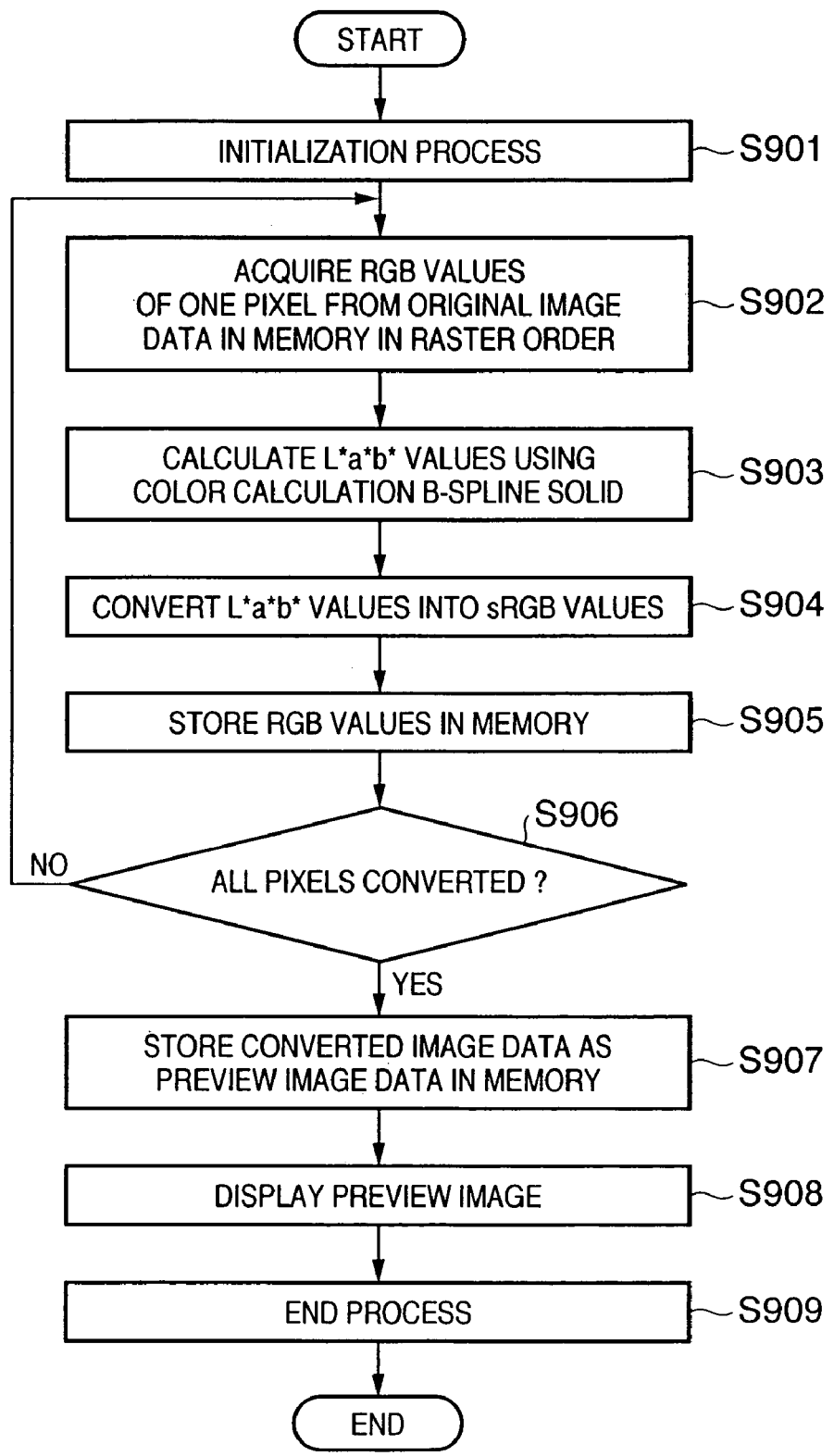
FIG. 11 is a flowchart for explaining a generation process of preview image data.

FIG. 11 is a flowchart for explaining a generation process of preview image data.

An initialization operation (e.g., for assuring a work memory area required to generate preview image data by discarding existing preview image data, initializing variables, and the like) is performed (S901). One pixel value (RGB values) is acquired from digital image data stored in the main memory 102 in the raster scan order (S902). The basis functions and coefficient values of the color calculation B-spline solid are acquired from the main memory 102, and L*a*b* values are calculated from the RGB values using the color calculation B-spline solid (S903) in the same manner as in step S803.

The calculated L*a*b* values are converted into RGB values based on sRGB (S904), and the RGB values are stored at memory addresses (main memory 102) according to the pixel position (S905). It is checked if the aforementioned conversion is applied to all pixels of the digital image data (S906). Steps S902 to S905 are repeated until the conversion is applied to all the pixels.

After the conversion is applied to all the pixels, the converted image data stored in the main memory 102 is stored in a predetermined area of the main memory 102 as preview image data (S907). The preview image data is displayed on the image preview display area 203 (S908). An end process (e.g., for releasing a work memory and the like) is executed (S909), thus ending the generation process of a preview image.

In this way, upon calculating colors from a plurality of representative colors, since colors are calculated to have a smooth change by naturally reflecting the trend of value changes, they can be precisely calculated even using a small number of representative colors. Furthermore, when this color calculation is applied to color adjustment, the influence range of color correction can be limited to a local region by utilizing the locality of the bases, and a color after adjustment can be directly designated. As a result of such correction, since colors change smoothly, color correction with very high gray balance can be attained.

Second Embodiment

An image process according to the second embodiment of the present invention will be described hereinafter. In this embodiment, the same reference numerals denote the same components as in the first embodiments, and a detailed description thereof will be omitted.

In the second embodiment, color correction and a color processing apparatus that provides a user interface for color correction will be explained. Note that the apparatus arrangement is the same as FIG. 3.

[Creation of Profile]

Figure 12:
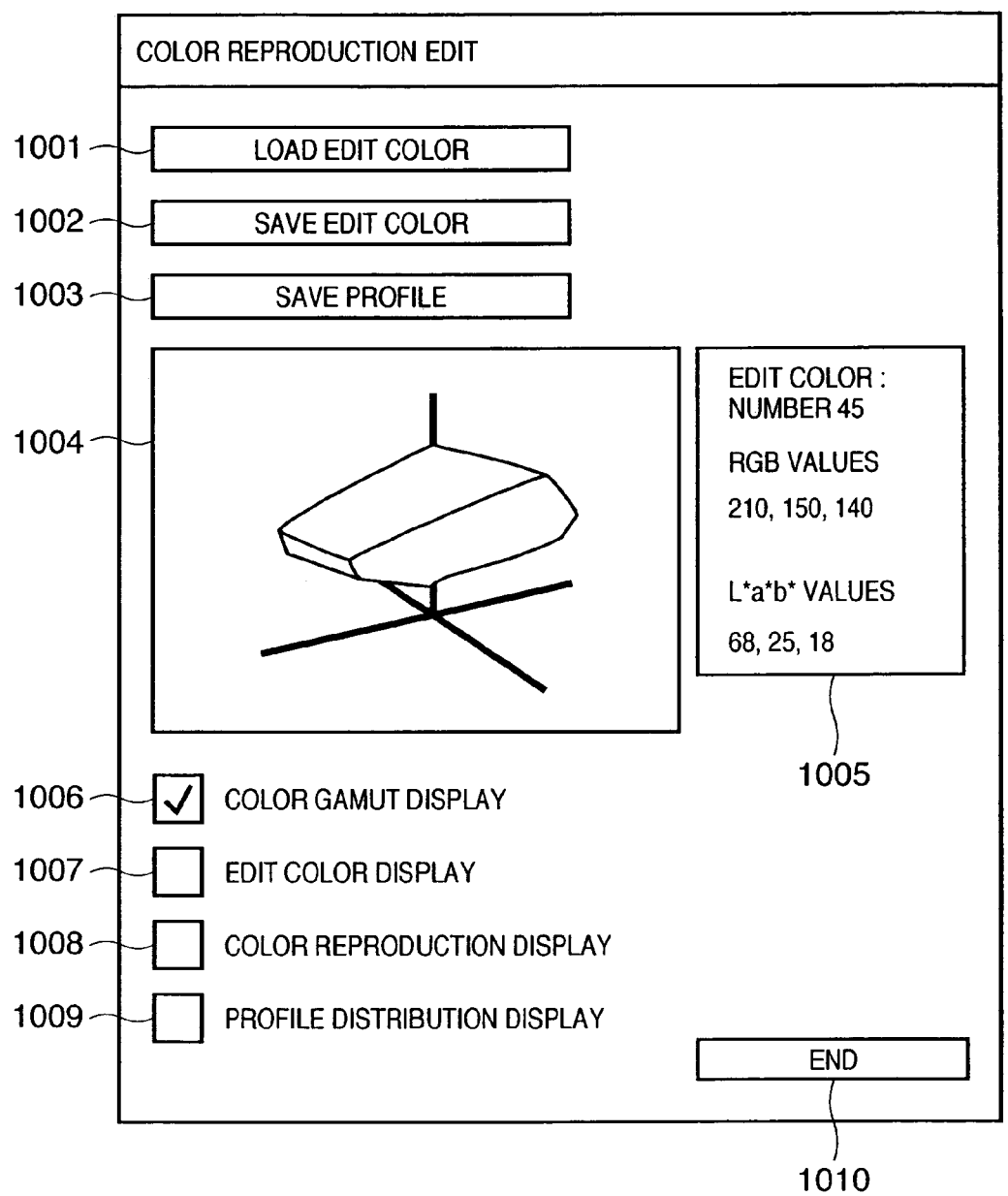
FIG. 12 shows a user interface used to create a profile by color correction.

FIG. 12 shows a user interface used to create a profile by color correction.

A color reproduction edit application stored in the HDD 105 is launched in response to a user's operation and a command from the CPU 101. A default profile and default edit color data stored in the HDD 105 are transferred to the main memory 102 via the SCSI I/F 103 and system bus 114 on the basis of a command from the CPU 101 in accordance with the process of the color reproduction edit application. The CPU 101 displays a window shown in FIG. 12 on the color monitor 107. The user edits color reproduction by correcting a color to be edited with reference to a three-dimensional (3D) display of color reproduction in the window.

The window shown in FIG. 12 includes a button 1001 used to issue a load instruction of edit color data, a button 1002 used to issue a save instruction of edit color data, a button 1003 used to save the color reproduction edit result as a profile, a 3D display area 1004 of color reproduction, an edit area 1005 used to display or input a color number, RGB values, and L*a*b* values in association with the color to be edited, a check box 1006 used to issue an ON/OFF instruction of gamut display, a check box 1007 used to turn on/off a point display of an edit color, a check box 1008 used to issue an ON/OFF instruction of a color reproduction display as a color reproduction edit result, a check box 1009 used to turn on/off a 3D display of a profile color distribution, and an application end button 1010.

When the user issues a load instruction of edit color data by clicking (or pressing) the load button 1001 of edit color data using the mouse 112 or the like, edit color data stored in the HDD 105 is transferred to the main memory 102 via the SCSI I/F 103 and system bus 114 on the basis of a command from the CPU 101 in accordance with the process of the color reproduction edit application. Or edit color data stored in a server connected to the LAN 113 or that on the Internet is transferred to the main memory 102 via the network I/F 104 and system bus 114 on the basis of a command from the CPU 101. Then, a color reproduction calculation process is executed. Also, the color reproduction calculation process is executed when the user edits a color on the edit area 1005.

The color reproduction calculation result is displayed on the color reproduction 3D display area 1004 as a virtual 3D display in accordance with the setups of the check boxes. When the gamut display check box 1006 is checked, a 3D pattern of the color gamut of the edit color data is displayed. When the edit color display check box 1007 is checked, all edit colors are displayed as points. When the color reproduction display check box 1008 is checked, color reproduction information formed according to the RGB values of the current edit color is displayed. When the profile distribution display check box 1009 is checked, LUT values of a profile are displayed as points. Of course, when the check boxes 1006 to 1009 are respectively ON/OFF, the display area 1004 is updated to the aforementioned display pattern.

When the user issues a save instruction of edit color data by pressing the edit color data save button 1002, the color reproduction edit application saves the edit color data which is being edited in the HDD 105.

When the user issues a profile save instruction by pressing the profile save button 1003, the color reproduction edit application saves the generated profile in the HDD 105.

When the user presses the end button 1010, the color reproduction edit application releases all data storage areas and work areas used in the process, and ends the process.

[Operation of Color Reproduction Edit Application]

Figure 13:
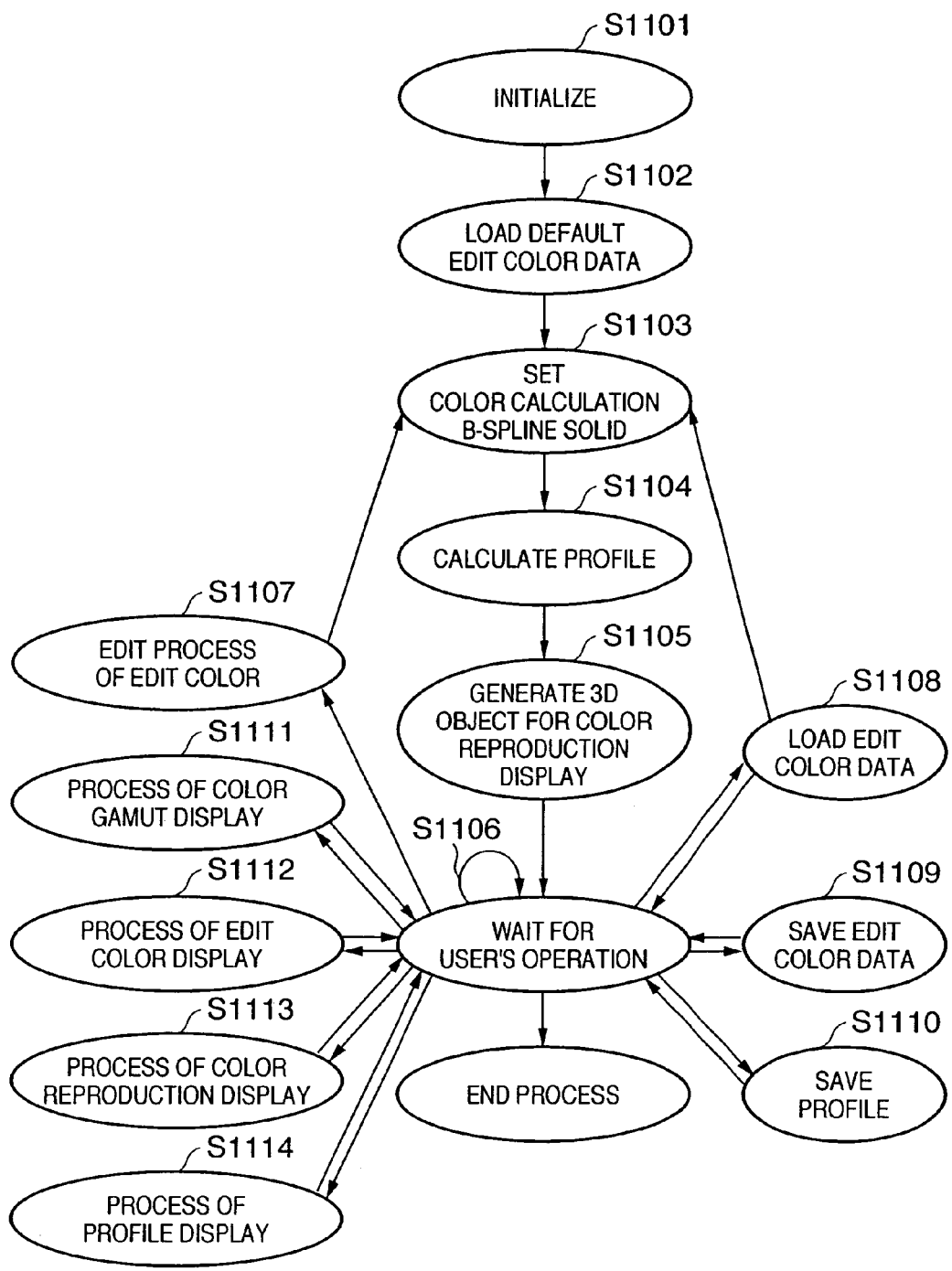
FIG. 13 is a status transition chart for explaining the operation of a color reproduction edit application.

FIG. 13 is a status transition chart for explaining the operation of the color reproduction edit application.

An initialization process (e.g., assurance of various memory areas required for operations, and the like) is executed (S1101), and default edit color data is loaded from the HDD 105 and stored in the main memory 102 (S1102). Note that the edit color data held on the main memory 102 has a data structure shown in FIG. 14, which includes sets of RGB values that specify colors on the RGB color space and L*a*b* color coordinates that represent reproduction colors upon printing, and triangle patch data indicating the color gamut. The total number of data is described at the head of the edit color data, and sets of RGB values and L*a*b* color coordinates are described in correspondence with the total number of data. Next, the total number of triangle patch data is described, and triangle patch data each including three L*a*b* values indicating three vertices of a triangle are described in correspondence with the total number of patches.

Next, the coefficients and basis functions for a color calculation B-spline solid are calculated by a process to be described later using the edit color data stored in the main memory 102 (S1103). A profile is created using the color calculation B-spline solid by a process to be described later and is stored in the main memory 102 (S1104). Then, 3D object data for virtual 3D display is calculated using the color calculation B-spline solid and profile by a process to be described later (S1105). Note that solid data for color gamut display, point data for an edit color display, solid data for color reproduction display, and point data for profile display are generated as 3D object data.

The control waits for user's operations (S1106). If the user presses the edit color data load button 1001 shown in FIG. 12 in this state, a dialog that prompts the user to designate an edit color data file to be loaded is displayed. If the user designates the file, it is checked if the file can be opened. If the file can be opened, that file is loaded and stored in the main memory 102. It is checked if the stored file has a correct format of edit color data (S1108). If the file can be opened and has a correct format, the flow advances to step S1103; if the file cannot be opened or has an illegal format, a message that advises accordingly is displayed, and the flow returns to step S1106.

If the user presses the edit color data save button 1002 shown in FIG. 12, the edit color data stored in the main memory 102 is saved in the HDD 105 in a predetermined format (S1109), and the flow returns to step S1106.

If the user presses the profile save button 1003 shown in FIG. 12, the profile stored in the main memory 102 is saved in the HDD 105 in a predetermined format (S1110), and the flow returns to step S1106.

If the user checks the color gamut display check box 1006 shown in FIG. 12, solid data for color gamut display is displayed; otherwise, that solid data is cleared (S1111), and the flow returns to step S1106. When the color gamut display is turned on, a graphic image in the 3D display area 1004 shown in FIG. 12 is displayed. Note that FIG. 12 shows a solo display example of the solid data for color gamut display, and other 3D object data may be superimposed in some cases.

Figure 15:
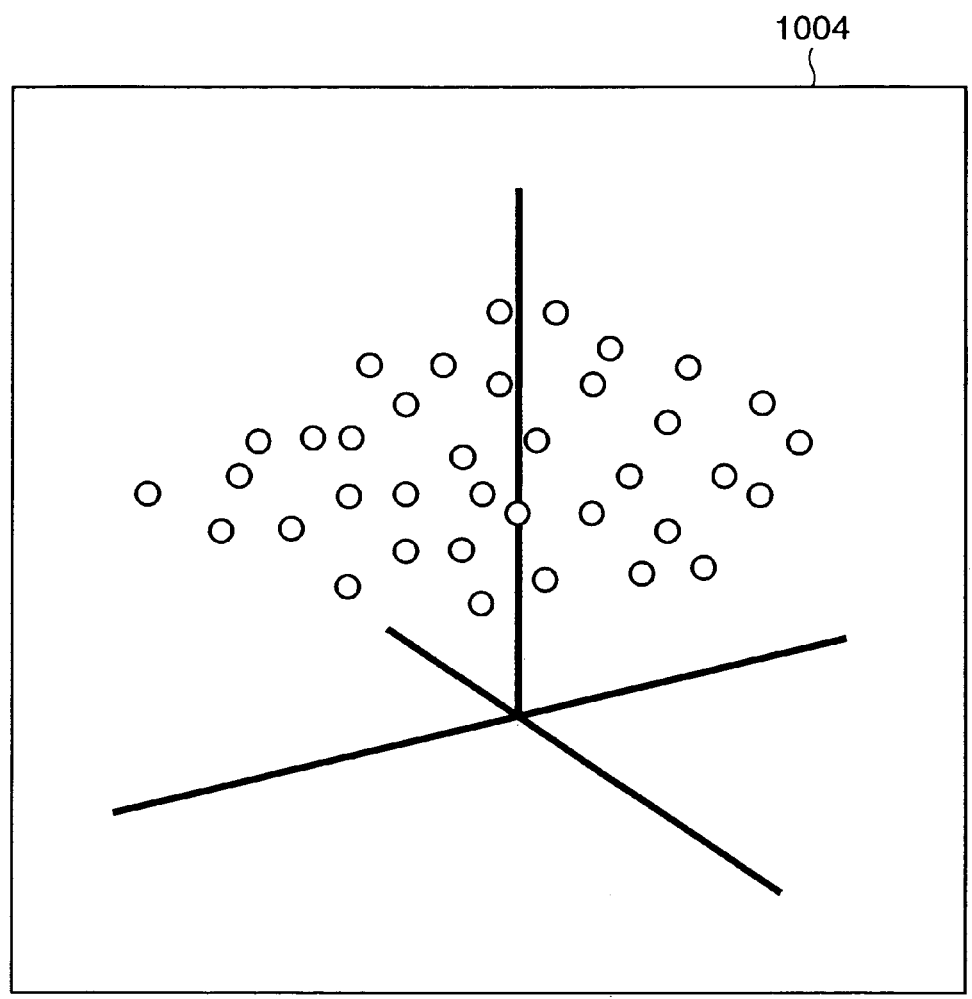
FIGS. 15 to 17 are views showing graphic images displayed on a three-dimensional (3D) display area in accordance with the operations of the user interface.

If the user checks the edit color display check box 1007 shown in FIG. 12, point data for edit color display is displayed; otherwise, that point data is cleared (S1112), and the flow returns to step S1106. When the edit color display is turned on, a graphic image in the 3D display area 1004 shown in FIG. 15 is displayed. Note that FIG. 15 shows a solo display example of the point data for edit color display, and other 3D object data may be superimposed in some cases.

Figure 16:
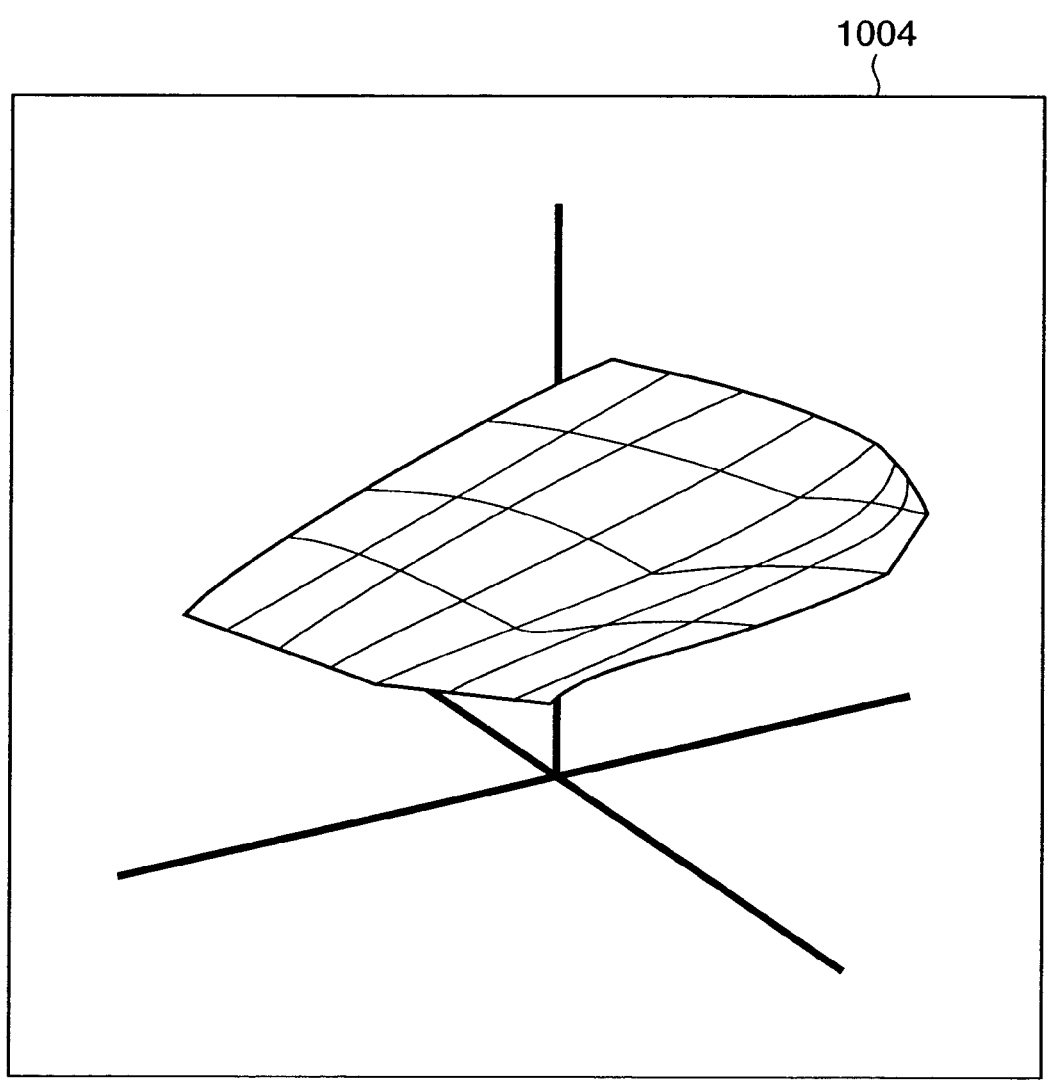

If the user checks the color reproduction display check box 1008, solid data for color reproduction display is displayed; otherwise, that solid data is cleared (S1113), and the flow returns to step S1106. When the color reproduction display is turned on, a graphic image in the 3D display area 1004 shown in FIG. 16 is displayed. Note that FIG. 16 shows a solo display example of the solid data for color reproduction display, and other 3D object data may be superimposed in some cases.

Figure 17:
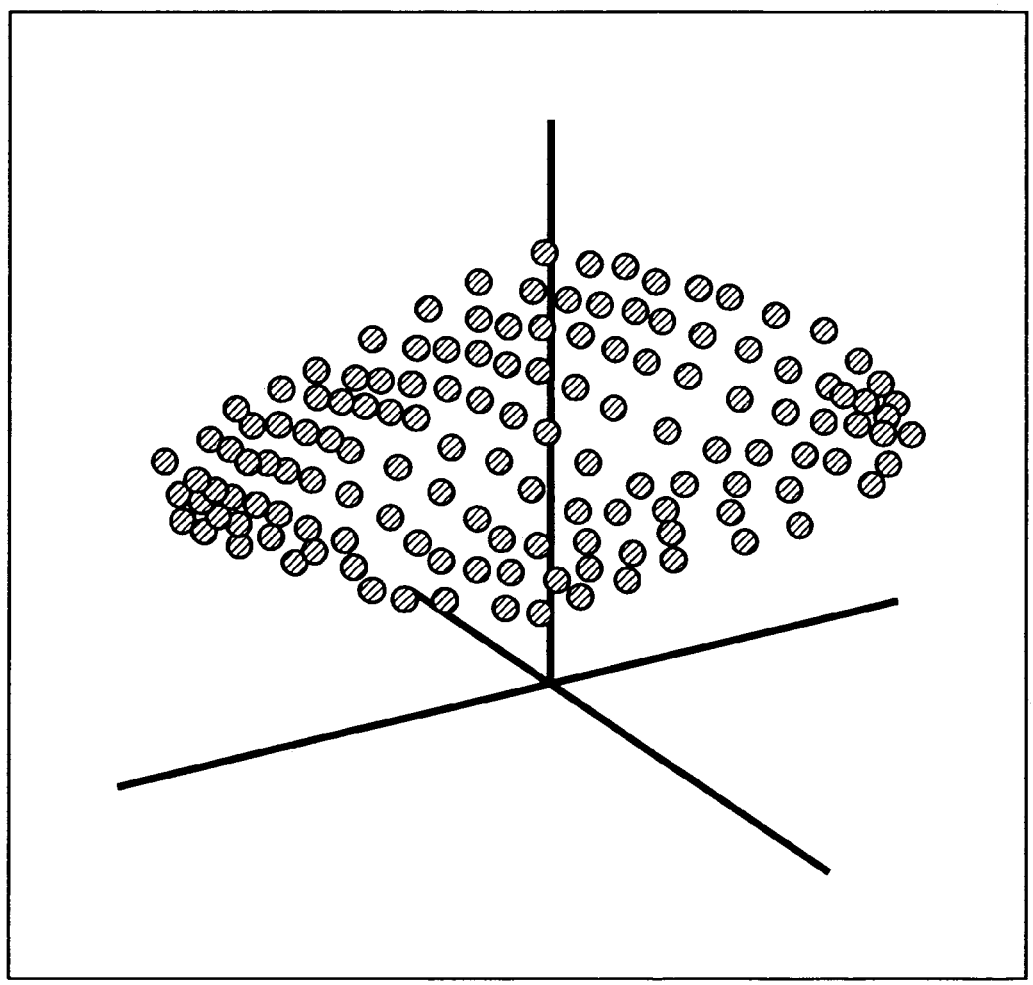

If the user checks the profile distribution display check box 1009, point data for profile display is displayed; otherwise, that point data is cleared (S1114), and the flow returns to step S1106. When the profile distribution display is turned on, a graphic image in the 3D display area 1004 shown in FIG. 17 is displayed. Note that FIG. 17 shows a solo display example of the point data for profile display, and other 3D object data may be superimposed in some cases.

If the user inputs any of the color number, RGB values, and L*a*b* values in the edit area 1005 in FIG. 12, the RGB value and L*a*b* values of the designated color number are corrected based on that input, and an L*a*b* value correction process (to be described later) is done (S1107). The flow then advances to step S1103.

If the user presses the end button 1010 shown in FIG. 12, the end operation (for releasing memory areas and the like) is done, thus ending the color reproduction edit application.

[Setting of Color Calculation B-Spline Solid (S1103)]

In the following description, a B-spline solid is described for the sake of simplicity by:

$$\begin{bmatrix} \lambda \\ a \\ b \end{bmatrix} = \sum_i \sum_j \sum_k C_{ijk} N_{ri}(rr) N_{gj}(gg) N_{bk}(bb) \tag{7}$$

where $C_{ijk}$ is a three-dimensional column vector that represents L*a*b* coefficients, and combines coefficients $c\lambda_{ijk}$, $ca_{ijk}$, and $cb_{ijk}$ described using the flowchart in FIG. 7 in the first embodiment.

Figure 18:
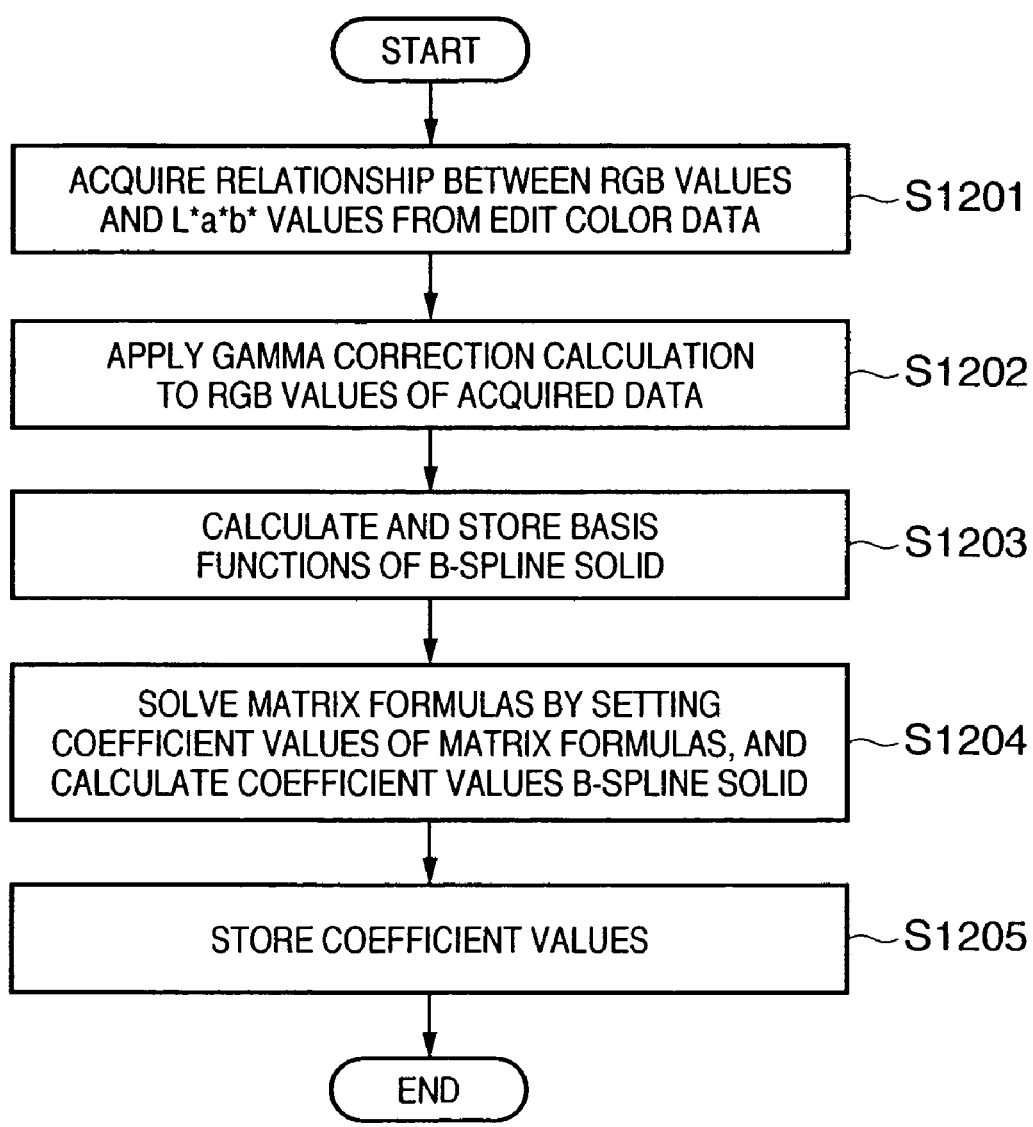
FIG. 18 is a flowchart for explaining a calculation process of coefficients and basis functions of a color calculation B-spline solid.

FIG. 18 is a flowchart for explaining the calculation process of coefficients and basis functions of the color calculation B-spline solid.

The correspondence between RGB values and L*a*b* values of edit colors is acquired for all the sets from the edit color data with the data structure shown in FIG. 14 (S1201), RGB values in all the acquired sets undergo a gamma correction calculation of $\gamma=2.2$ (S1202), and basis functions are calculated and stored in the main memory (S1203). Note that the number of knots is n−1 since the total number of edit color data of the edit color data is $n^3$.

Next, matrix formulas are calculated as in step S403 in FIG. 7, and coefficients of the B-spline solid are calculated using these formulas (S1204). The calculated coefficients are stored in the main memory 102 (S1205).

[Calculation of Profile (S1104)]

Figure 19:
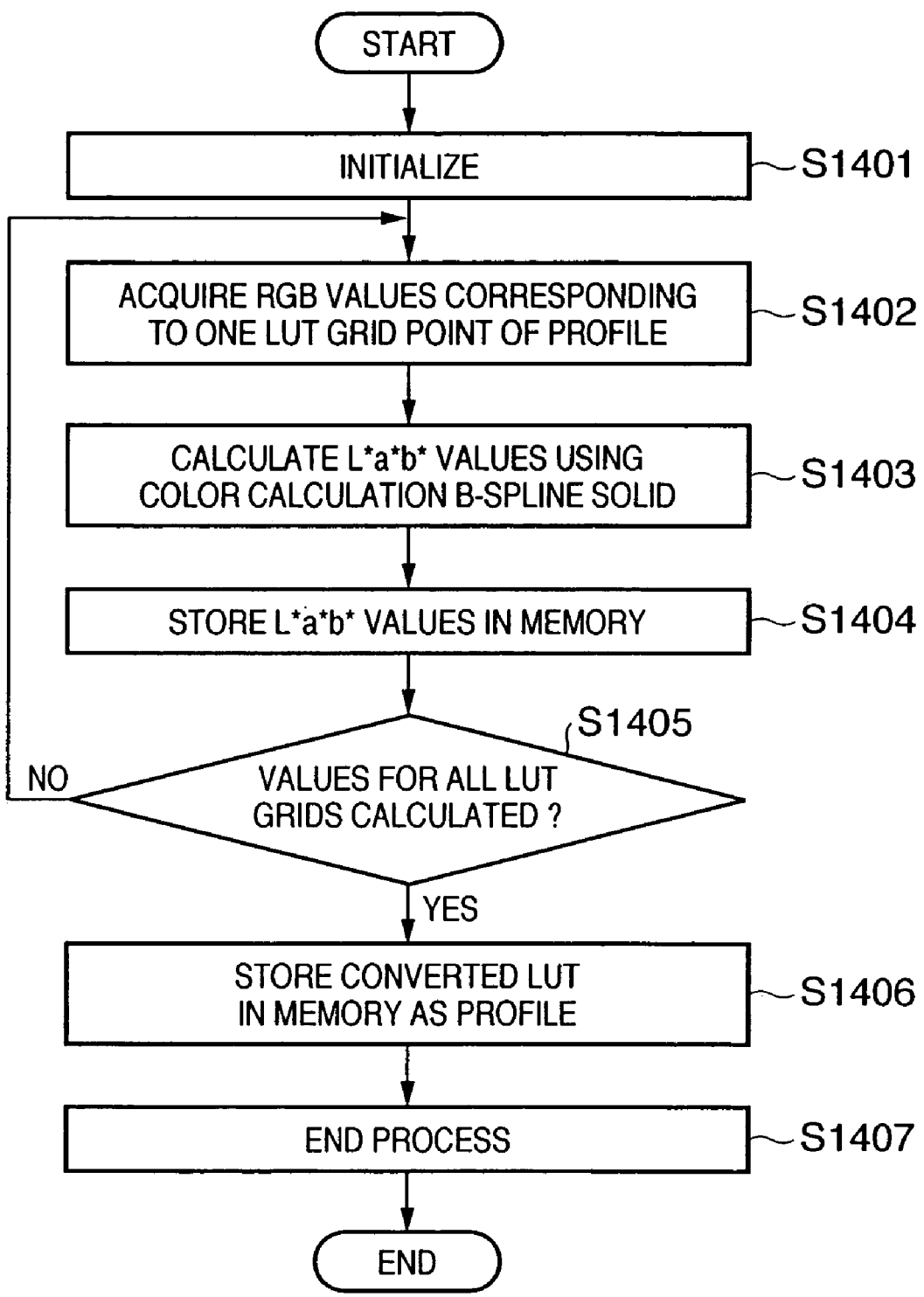
FIG. 19 is a flowchart for explaining creation of a profile using a color calculation B-spline solid.

FIG. 19 is a flowchart for explaining profile creation using the color calculation B-spline solid.

An initialization operation (e.g., for assuring a work memory area, initializing variables, and the like) is performed (S1401). RGB values corresponding to one LUT grid point of the profile are acquired according to an appropriate order (S1402). The basis functions and coefficient values of the color calculation B-split solid are acquired from the main memory 102, and L*a*b* values are calculated (S1403) using:

$$\begin{bmatrix} \lambda \\ a \\ b \end{bmatrix} = \sum_i \sum_j \sum_k C_{ijk} N_{ri}(rr) N_{gj}(gg) N_{bk}(bb) \tag{8}$$

where rr, gg, and bb are values obtained by applying a gamma correction calculation of $\gamma=2.2$ to the R, G, and B values acquired in step S1402.

The calculated L*a*b* values are stored at a memory address (main memory 102) corresponding to the LUT grid point position (S1404). It is checked if the above conversion is applied to all LUT grid points. Steps S1402 to S1404 are repeated until the above conversion is applied to all LUT grid points.

After the conversion is applied to all the LUT grid points, the converted LUT data stored in the main memory 102 are stored as profile data in a predetermined area of the main memory 102 (S1406), and an end operation (for, e.g., releasing a work memory and the like) is done (S1407), thus ending the profile creation process.

[Generation of 3D Object (S1105)]

As the solid data for color gamut display, solid data expressed by a polygon is generated using all triangle patch data included in the edit color data. As the point data for edit color display, point data are generated using L*a*b* values of all edit color data as points. As the point data for profile display, point data are generated using all L*a*b* table values in an LUT as points. Furthermore, the solid data for color reproduction display is generated as follows.

Initially, 5×5×5 grids having steps [0, 64, 128, 192, 255] are generated, and a rectangular solid with a maximum volume, which has, as vertices, those of grid cubes and grid points that neighbor edit colors, is acquired. Next, for all grid points on the rectangular solid, L*a*b* values are calculated from RGB values in the same manner as in step S1403. Finally, solid data for color reproduction display, which is expressed by a polygon, is generated from the sets of calculated L*a*b* values.

[Edit of Edit Color (S1107)]

Figure 20:
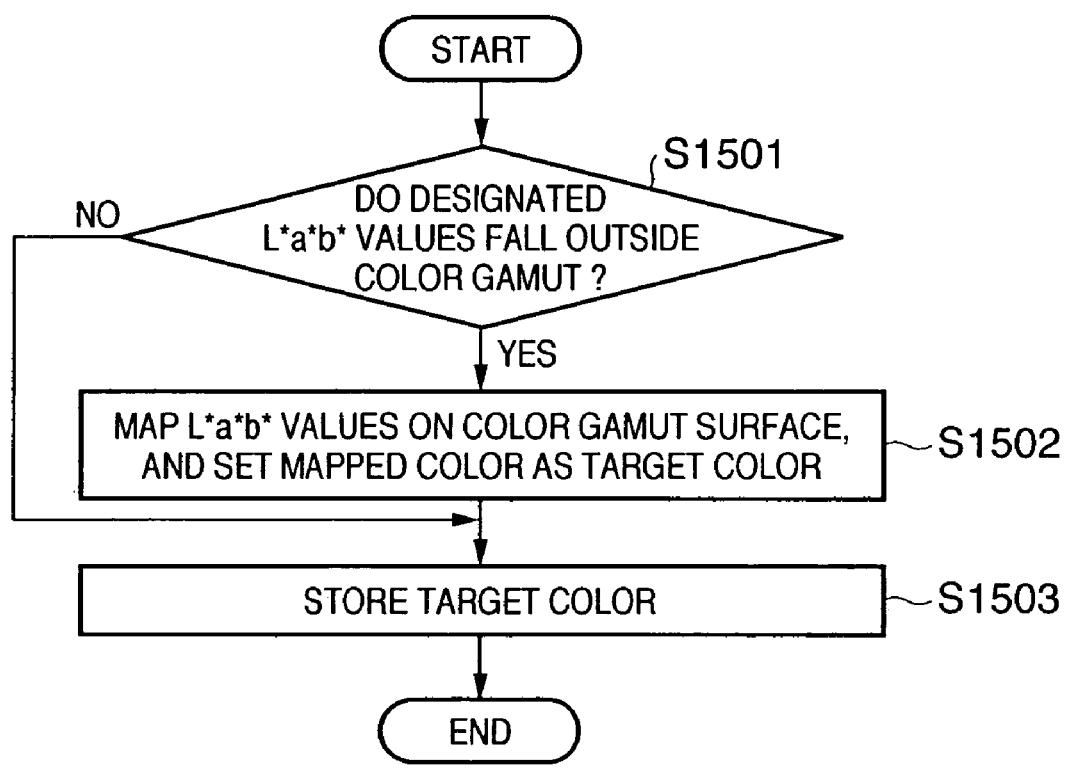
FIG. 20 is a flowchart for explaining a process for correcting one or both of RGB values and L*a*b* values for color edit data.

FIG. 20 is a flowchart for explaining the process for correcting one or both of RGB values and L*a*b* values of edit color data with a number designated on the edit area 1005 in FIG. 12.

Figure 21:
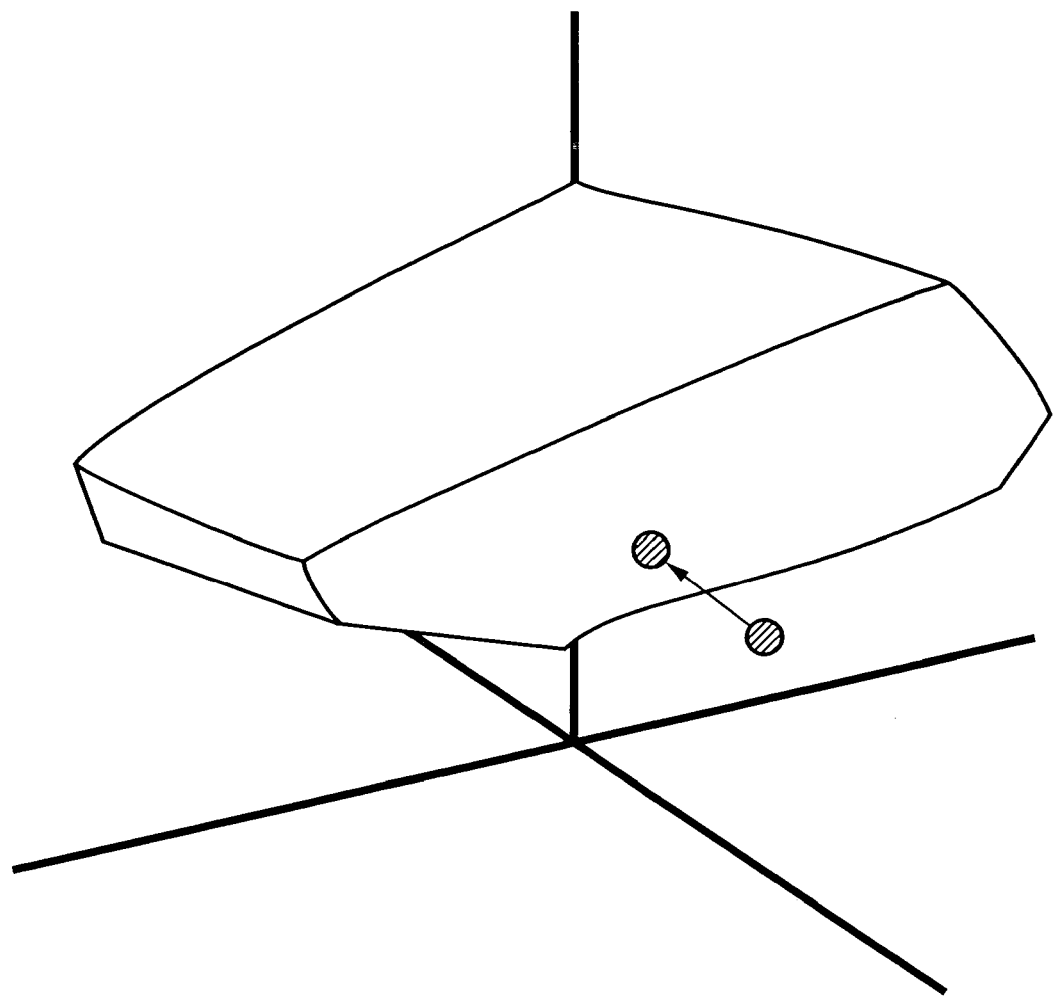
FIG. 21 is a view for explaining a method of setting a target color when L*a*b* values falling outside a color gamut are designated.

It is checked if the designated L*a*b* values fall outside the color gamut (S1501). If it is determined that the designated L*a*b* values fall outside the color gamut, an intersection where a straight line which connects the color of the designated L*a*b* values and that of L*a*b* values (50, 0, 0) intersects with the color gamut is calculated, and the values at the calculated intersection are set as a target color, as shown in FIG. 21 (S1502). On the other hand, if the designated L*a*b* values do not fall outside the color gamut, the designated L*a*b* values are set as a target color. Then, the RGB values and L*a*b* values of the target color are stored in the main memory 102 as edit color data of the designated number (S1503).

In this manner, the color adjustment interface that can be easily controlled by the user can be provided.

In each of the above embodiments, the basic calculation method in color calculation has been explained, and their application examples have been explained. Therefore, the present invention can be applied to various other intended uses such as gamut mapping, color separation from RGB to CMYK, creation of a profile, calibration, and the like in addition to the preview and color reproduction correction described in the embodiments.

Modification of Embodiment

In the description of each of the above embodiments, B-spline is used as a basis function in solid expression. However, as basis functions, various other piecewise functions such as rational B-spline, nonuniform rational B-spline, Bezier, Rational Bezier, and the like can be used. Note that the above embodiments have been explained using the most typical B-spline since it is more desirable that the locality of the basis function is present.

In the description of each of the above embodiments, the number of knots of each basis is the same. However, as can be easily imagined from the above description, the number of knots may be changed for each basis. In the first embodiment, let l be the number of knots in the R-axis direction, m be that in the G-axis direction, and n be that in the B-axis direction. Then, the number of data of a profile is given by (l+1)×(m+1)×(n+1), and the numbers of nests of the profile are respectively "l+1" for R, "m+1" for G, and "n+1" for B. Also, in the second embodiment, let l be the number of knots in the R-axis direction, m be that in the G-axis direction, and n be that in the B-axis direction. Then, the number of data of the edit color data is given by (l+1)×(m+1)×(n+1).

In each of the above embodiments, L*a*b* three dimensions are calculated from RGB three dimensions. However, a dimension to be calculated is not particularly limited. For example, when a gray value (scalar value) is calculated from RGB values, it can be expressed by:

$$\text{gray} = \Sigma_i \Sigma_j \Sigma_k c_{ijk} N_{ri}(rr) N_{gj}(gg) N_{bk}(bb) \qquad (9)$$

Also, when CMYK values are calculated from RGB values, they can be expressed by:

$$\begin{bmatrix} c \\ m \\ y \\ k \end{bmatrix} = \sum_i \sum_j \sum_k C_{ijk} N_{ri}(rr) N_{gj}(gg) N_{bk}(bb) \qquad (10)$$

where $C_{ijk}$ is a four-dimensional column vector that expresses cmyk coefficients.

In each of the above embodiments, solid expression based on RGB three dimensions is used as a color space to be given to each formula. However, as can be easily imagined from the above description, such expression can be easily expanded to a two-dimensional surface expression like xy chromaticity values, or a four-dimensional expression or more like cmyk. For example, RGB values can be calculated from xy chromaticity values by:

$$\begin{bmatrix} R \\ G \\ B \end{bmatrix} = \sum_i \sum_j C_{ij} N_{xi}(x) N_{yj}(y) \qquad (11)$$

Or L*a*b* values can be calculated from CMYK values by:

$$\begin{bmatrix} \lambda \\ a \\ b \end{bmatrix} = \sum_i \sum_j \sum_k \sum_l C_{ijkl} N_{ci}(c) N_{mj}(m) N_{yk}(y) N_{bkl}(bk) \qquad (12)$$

As can be seen from the above formulas, the multiplicity of the summation calculations must be equal to the number of dimensions of the color space to be given to each formula, i.e., that of input color signal values. In order to calculate coefficients in the summation formulas, matrix formulas must be changed upon expansion of the solid expression.

As can be seen from the above embodiments, the color spaces to be used are not particularly limited, and color spaces such as CMYK, L*a*b*, JCH, XYZ, xy, and the like can be used. Furthermore, the present invention can be applied to ink color separation, and a six-dimensional color space obtained by adding light cyan and light magenta to CMYK or the like can be used. Furthermore, a color space to be given to each formula may be the same as that to be calculated using that formula.

In the second embodiment, values to be given to the B-spline solid undergo a gamma correction calculation. However, this conversion can be replaced by other high-order conversions, RGB→RGB affine transformation, and the like.

Third Embodiment

A color process according to the third embodiment of the present invention will be explained below. Note that the same reference numerals in the third embodiment denote the same components as those in the first and second embodiments, and a detailed description thereof will be omitted.

[Overview]

According to the technique for implementing color calculation by means of nonlinear calculations described in the first and second embodiments, since colors are calculated to have a smooth change by naturally reflecting the trend of color value changes upon calculating colors from a plurality of representative colors, colors can be precisely calculated even using a small number of representative colors. When this technique is further applied to color adjustment, the influence range of color correction can be naturally limited to a local region by utilizing the locality of a basis, and a color after adjustment can be directly designated. Furthermore, since colors change smoothly after correction, color correction that can assure very high gray balance can be attained. Of course, this technique can be applied to various intended uses associated with image processes such as gamut mapping, color separation from RGB to CMYK, creation of a profile, calibration, and the like.

However, upon defining a nonlinear calculation, the coefficient values of a basis function of the nonlinear calculation are set to pass a predetermined color coordinate value. According to such calculation method, the nonlinear calculation has smooth calculation characteristics, but oscillation may occur, as can be easily inferred from a linear spline function.

Figure 23A:
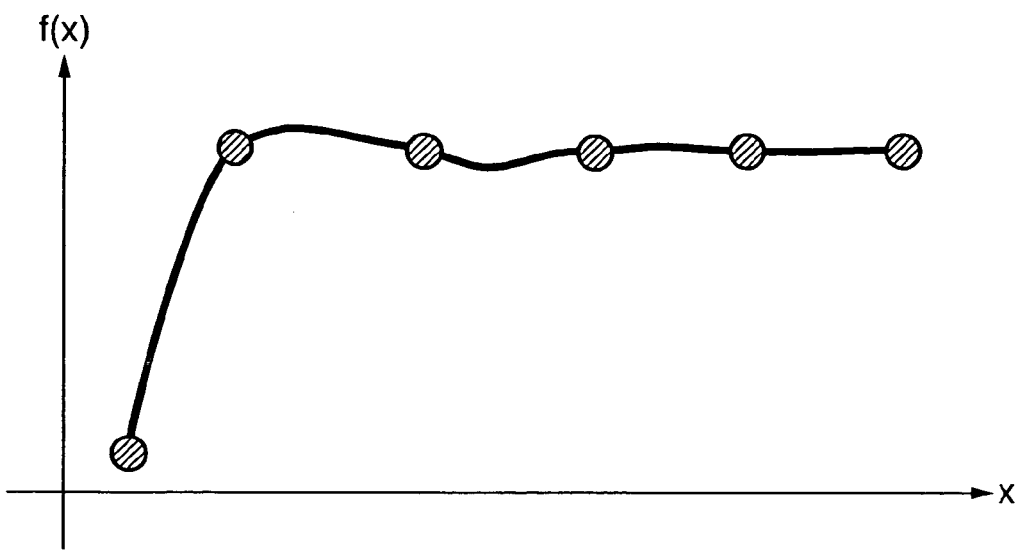
FIGS. 23A and 23B are views for explaining oscillation that occurs in a linear spline function.
Figure 23B:
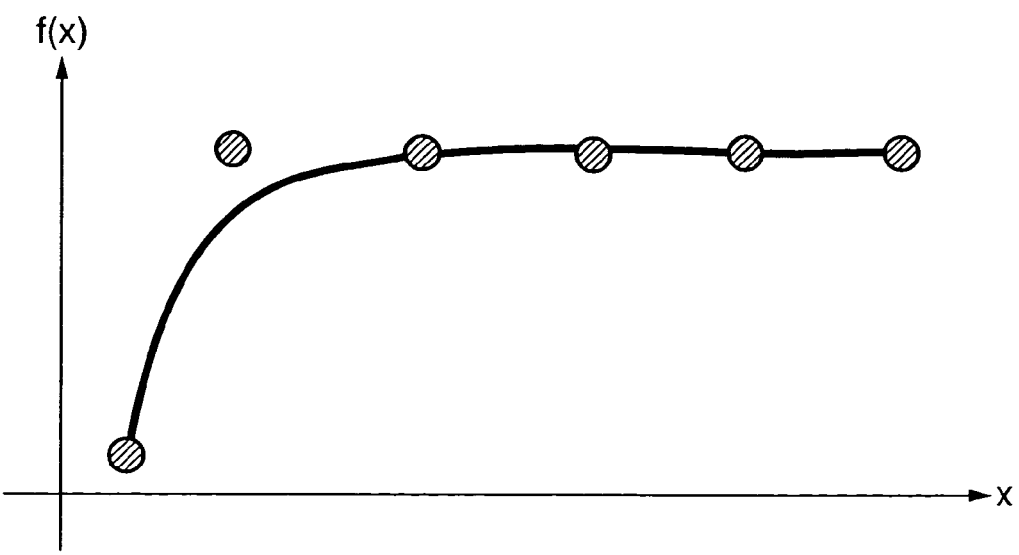

FIGS. 23A and 23B are views for explaining the aforementioned oscillation taking a linear B-spline function as an example. Determining the coefficient values of a basis function to pass a predetermined color coordinate value corresponds to setting a linear B-spline function to pass a predetermined value, as shown in FIG. 23A or 23B, and oscillation may occur even slightly, as shown in FIG. 23A. Such oscillation may poses a problem depending on color signals to be calculated. For example, oscillation in a lightness signal appears as a luminance (or density) nonuniformity of an image, and is readily perceived as an image disturbance.

[Setting of Color Calculation B-Spline Solid (S1103)]

The calculation process (S1103) of the coefficients and basis functions of the color calculation B-spline solid in FIG. 13 will be explained first. In the following description, the B-spline solid is defined by:

$$\lambda = \Sigma_i \Sigma_j \Sigma_k c\lambda_{ijk} N_{ri}(rr) N_{gj}(gg) N_{bk}(bb)$$

$$a = \Sigma_i \Sigma_j \Sigma_k ca_{ijk} N_{ri}(rr) N_{gj}(gg) N_{bk}(bb)$$

$$b = \Sigma_i \Sigma_j \Sigma_k cb_{ijk} N_{ri}(rr) N_{gj}(gg) N_{bk}(bb) \quad (13)$$

where rr, gg, and bb are RGB values, $\lambda$, a, and b are L*a*b* values, $N_r$ is the basis function in the R-axis direction, $N_g$ is the basis function in the G-axis direction, and $N_b$ is the basis function in the B-axis direction, $c\lambda_{ijk}$, $ca_{ijk}$, and $cb_{ijk}$ are coefficients, and suffixes i, j, and k appended to $N_r$, $N_g$, and $N_b$ are respectively the basis function numbers in bases for respective axes.

Figure 22:
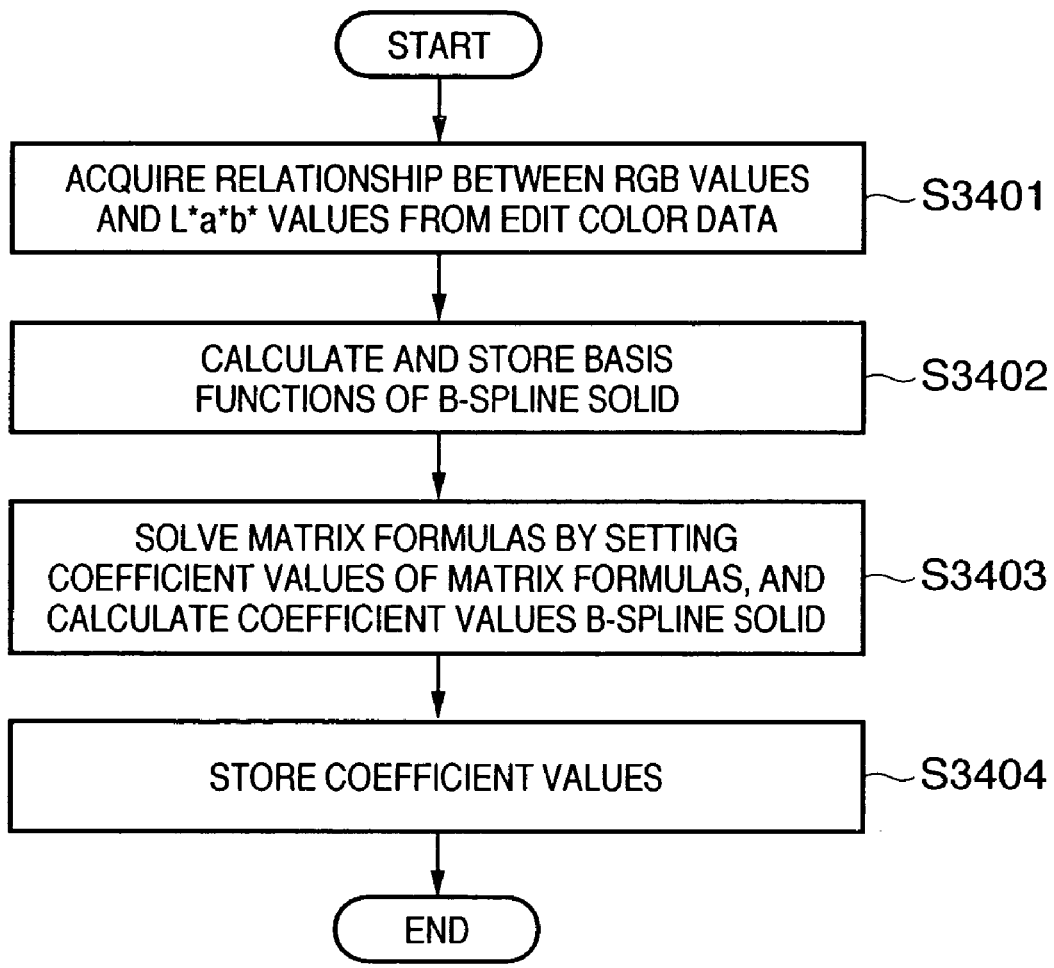
FIG. 22 is a flowchart for explaining a calculation process of coefficients and basis functions of a color calculation B-spline solid in the second embodiment.

FIG. 22 is a flowchart of the calculation process (S1103) of the coefficients and basis functions of the color calculation B-spline solid.

All sets of corresponding data of RGB values and L*a*b* values as edit colors are acquired from the edit color data with the data structure shown in FIG. 14 (S3401). In the following description, assume that RGB values of the i-th edit color are $rr_i$, $gg_i$, and $bb_i$, and L*a*b* values are $\lambda_i$, $a_i$, and $b_i$.

After knots are appropriately determined, basis functions are calculated based on these knots and are stored in the main memory 102 (S3402). As the method of determining knots, the number of knots and coordinates may be determined in advance or knots may be determined from changes in L*a*b* values. The calculations of the basis functions after knots are determined use a general DeBoor-Cox algorithm. If each of the basis functions $N_r$, $N_g$, and $N_b$ is a B-spline basis of degree 3, and the number of knots is 4, it becomes a basis function of four knots $\xi 0$ to $\xi 3$, as shown in FIG. 8. Note that FIG. 8 shows the basis function $N_r$ of the R-axis. The basis function will be explained as a B-spline basis of degree 3 having four knots hereinafter.

Next, coefficients of the B-spline solid having characteristics that are approximate to the calculated basis functions and a sequence of corresponding data of the RGB values and L*a*b* values acquired from the edit color data shown in FIG. 14 (or characteristics which are obtained by smoothing a polygon set that connect these corresponding data) are calculated (S3403). For example, when viewed linearly, it is equivalent to calculate B-spline function as indicated in FIG. 23B that a vibration or ripple indicated in FIG. 23A is suppressed.

This process is done by solving a matrix formula f=MC respectively for L*, a*, and b* components using LUT decomposition and calculating coefficients. Coefficient calculations based on the above formula will be described in detail below.

A component $m_{st}$ at the s-th row and t-th column of a matrix M is calculated by:

$$m_{st} = \Sigma_x \{N_{ri}(rr_x) N_{gj}(gg_x) N_{bk}(bb_x) \cdot N_{rl}(rr_x) N_{gm}(gg_x) N_{bn}(bb_x)\} \quad (14)$$

In this case, s=25(i−1)+5(j−1)+k for s among i, j, and k, and t=25(l−1)+5(m−1)+n for t among l, m, and n. Note that this relationship changes depending on the number of knots and the degree of the basis function. For example, in case of the B-spline basis of degree 3 having six knots, we have t=49(i−1)+7(j−1)+k.

Calculations of the coefficients $c\lambda_{ijk}$, $ca_{ijk}$, and $cb_{ijk}$ will be described below. In order to calculate the coefficient $c\lambda_{ijk}$, a column vector f$\lambda$ is defined by calculating an s-row component f$\lambda_s$ of the column vector f$\lambda$ by:

$$f\lambda_s = \Sigma_x N_{ri}(rr_x) N_{gj}(gg_x) N_{bk}(bb_x) \cdot \lambda_x \quad (15)$$

In this case as well, s=25(i−1)+5 (j−1)+k for s among i, j, and k, and this relationship changes depending on the number of knots and the degree of the basis function. In order to calculate the coefficient $c\lambda_{ijk}$, the following matrix formulas are solved using LUT decomposition:

$$c\lambda = [c\lambda_{111}, c\lambda_{112}, \ldots, c\lambda_{115}, c\lambda_{121}, \ldots c\lambda_{155}, c\lambda_{211}, \\ \ldots, c\lambda_{554}, c\lambda_{555}]$$

$$f\lambda = M \cdot c\lambda \tag{16}$$

In order to calculate the coefficient $ca_{ijk}$, a column vector fa is defined by calculating an s-row component $fa_s$ of the column vector fa by:

$$fa_s = \Sigma_x N_{ri}(rr_x) N_{gj}(gg_x) N_{bk}(bb_x) \cdot a_x \tag{17}$$

After that, the following matrix formulas are solved using LUT decomposition:

$$ca = [ca_{111}, ca_{112}, \ldots, ca_{115}, ca_{121}, \ldots ca_{155}, ca_{211}, \\ \ldots, ca_{554}, ca_{555}]$$

$$fa = M \cdot ca \tag{18}$$

In order to calculate the coefficient $cb_{ijk}$, a column vector fb is defined by calculating an s-row component $fb_s$ of the column vector fb by:

$$fb_s = \Sigma_x N_{ri}(rr_x) N_{gj}(gg_x) N_{bk}(bb_x) \cdot b_x \tag{19}$$

After that, the following matrix formulas are solved using LUT decomposition:

$$cb = [cb_{111}, cb_{112}, \ldots, cb_{115}, cb_{121}, \ldots cb_{155}, cb_{211}, \\ \ldots, cb_{554}, cb_{555}]$$

$$fb = M \cdot cb \tag{20}$$

The calculated coefficients are stored in the main memory 102 (S3404).

When the equations (15) and (17) are used, the sum of square of error values becomes small, thus the vibration or ripple is suppressed.

[Calculation of Profile (S1104)]

The creation process (S1104) of a profile using the color calculation B-spline solid will be explained below using FIG. 19.

An initialization operation (e.g., for assuring a work memory area, initializing variables, and the like) is performed (S1401). RGB values corresponding to one LUT grid point of the profile are acquired according to an appropriate order (S1402). The basis functions and coefficient values of the color calculation B-split solid are acquired from the main memory 102, and L*a*b* values are calculated (S1403) using:

$$\lambda = \Sigma_{i=1}^{5} \Sigma_{j=1}^{5} \Sigma_{k=1}^{5} c\lambda_{ijk} N_{ri}(rr) N_{gj}(gg) N_{bk}(bb)$$

$$a = \Sigma_{i=1}^{5} \Sigma_{j=1}^{5} \Sigma_{k=1}^{5} ca_{ijk} N_{ri}(rr) N_{gj}(gg) N_{bk}(bb)$$

$$b = \Sigma_{i=1}^{5} \Sigma_{j=1}^{5} \Sigma_{k=1}^{5} cb_{ijk} N_{ri}(rr) N_{gj}(gg) N_{bk}(bb) \tag{21}$$

where rr, gg, and bb are RGB values, $\lambda$, a, and b are L*a*b* values, $N_r$ is the basis function in the R-axis direction, $N_g$ is the basis function in the G-axis direction, and $N_b$ is the basis function in the B-axis direction, $c\lambda_{ijk}$, $ca_{ijk}$, and $cb_{ijk}$ are coefficients, and suffixes i, j, and k appended to $N_r$, $N_g$, and $N_b$ are respectively the basis function numbers in bases for respective axes.

The calculated L*a*b* values are stored at a memory address (main memory 102) corresponding to the LUT grid point position (S1404). It is checked if the above conversion is applied to all LUT grid points (S1405). Steps S1402 to S1404 are repeated until the above conversion is applied to all LUT grid points.

After the conversion is applied to all the LUT grid points, the converted LUT data stored in the main memory 102 are stored as profile data in a predetermined area of the main memory 102 (S1406), and an end operation (for, e.g., releasing a work memory and the like) is done (S1407), thus ending the profile creation process.

[Generation of 3D Object (S1105)]

The generation process of solid data for color gamut display in step S1105 is the same as that in the first embodiment, and a detailed description thereof will be omitted.

[Edit of Edit Color (S1107)]

The edit process of edit colors in step S1107 is the same as that in the first embodiment, and a detailed description thereof will be omitted.

In this manner, since nonlinear calculations are made to approximate/smooth colors to be distributed, appropriate color reproduction can be obtained while suppressing oscillation and ripple components of the aforementioned nonlinear calculations. That is, taking a linear B-spline function, a smooth function free from any oscillation and ripple components, as shown in FIG. 23B, can be calculated. Furthermore, since nonlinear calculations are defined to minimize the sum total of errors, a good result can be obtained in terms of faithfulness of color reproduction.

Therefore, the third embodiment is very effective for color calculations since it can naturally reflect the trend of changes of color signal values, and can implement smooth nonlinear calculations free from any oscillation and ripple components.

Note that the basic calculation method in color calculations has been explained, and its application example have been explained. However, this embodiment is not limited to the above color reproduction correction, but can be applied to various other intended uses associated with image processes such as gamut mapping, calibration, and the like.

Fourth Embodiment

A color process according to the fourth embodiment of the present invention will be described below. Note that the same reference numerals in the fourth embodiment denote the same components as those in the first to third embodiments, and a detailed description thereof will be omitted.

In the fourth embodiment, the color calculation method using a B-spline solid is modified. More specifically, after RGB values undergo gamma correction calculations, colors are calculated using the B-spline solid. Hence, the calculation process of the coefficients and basis functions of the color calculation B-spline solid in step S1103 and the profile creation process in step S1104 as differences from the third embodiment will be explained below.

[Setting of Color Calculation B-Spline Solid (S1103)]

In the following description, a B-spline solid is described for the sake of simplicity by:

$$\begin{bmatrix} \lambda \\ a \\ b \end{bmatrix} = \sum_i \sum_j \sum_k C_{ijk} N_{ri}(rr) N_{gj}(gg) N_{bk}(bb) \tag{22}$$

where $C_{ijk}$ is a three-dimensional column vector that represents L*a*b* coefficients, and combines coefficients $c\lambda_{ijk}$, $ca_{ijk}$, and $cb_{ijk}$ described using the flowchart in FIG. 7 in the first embodiment.

The calculation process of coefficients and basis functions of the color calculation B-spline solid will be described below with reference to the flowchart shown in FIG. 18.

In the sRGB format, RGB values undergo gamma calculations and matrix calculations to be converted into XYZ values. Hence, RGB reproduction colors in sRGB exhibit a distribution which deviates to have a certain trend. Hence, in order to improve the color calculation precision using a B-spline solid, RGB values are preferably corrected by gamma calculations.

The correspondence between RGB values and L*a*b* values of edit colors is acquired for all the sets from the edit color data with the data structure shown in FIG. 14 (S1201), RGB values in all the acquired sets undergo a gamma correction calculation of γ=2.2 (S1202), and knots are appropriately determined. After that, basis functions are calculated based on these knots and are stored in the main memory (S1203). Note that the basis function will be explained as a B-spline basis of degree 3 having four knots hereinafter.

Next, matrix formulas are calculated as in step S403 in FIG. 7, and coefficients of the B-spline solid are calculated using these formulas (S1204). The calculated coefficients are stored in the main memory 102 (S1205). In this case, parameter values to be substituted in each basis function are not RGB values themselves but values which are obtained by applying the gamma correction calculations to the RGB values unlike in step S403.

Note that the gamma coefficient used in this case is not directly related to a gamma corresponding value 2.2 in the sRGB format. Hence, when a value other than 2.2 (e.g., 1.7) is used, the color calculation precision may often be improved.

[Calculation of Profile (S1104)]

The profile creation sequence using the color calculation B-spline solid is the same as in the flowchart of the first embodiment shown in FIG. 19. Hence, an initialization operation (e.g., for assuring a work memory area, initializing variables, and the like) is performed (S1401). RGB values corresponding to one LUT grid point of the profile are acquired according to an appropriate order (S1402). The basis functions and coefficient values of the color calculation B-split solid are acquired from the main memory 102, and L*a*b* values are calculated (S1403) using:

$$\begin{bmatrix} \lambda \\ a \\ b \end{bmatrix} = \sum_i \sum_j \sum_k C_{ijk} N_{ri}(rr) N_{gj}(gg) N_{bk}(bb) \quad (23)$$

where rr, gg, and bb are values obtained by applying a gamma correction calculation of γ=2.2 to the R, G, and B values acquired in step S1402.

The calculated L*a*b* values are stored at a memory address (main memory 102) corresponding to the LUT grid point position (S1404). It is checked if the above conversion is applied to all LUT grid points (S1405). Steps S1402 to S1404 are repeated until the above conversion is applied to all LUT grid points.

Modification of Embodiment

Weighted Approximation

In the third and fourth embodiments, a B-spline solid is calculated to minimize the sum total of distances between colors calculated using the B-spline solid and edit colors without weighting. However, respective edit colors may be weighted, and the B-spline solid may be calculated to minimize the sum total of weighted distances. In this case, taking calculation of a lightness calculation coefficient in the first embodiment, a matrix element and left-hand side vector element of the matrix formulas are given by:

$$m_{st} = \Sigma_x \{ w_x N_{ri}(rr_x) N_{gj}(gg_x) N_{bk}(bb_x) \cdot N_{rl}(rr_x) N_{gm}(gg_x) N_{bn}(bb_x) \}$$

$$f \lambda_s = \Sigma_x \{ w_x N_{ri}(rr_x) N_{gj}(gg_x) N_{bk}(bb_x) \cdot \lambda_x \} \quad (24)$$

where $w_x$ is a weight value for the x-th edit color, and approximation of that color improves with increasing weight value.

As a weight coefficient setting method, for example, the user may manually designate a weight coefficient for an edit color near a flesh color. When the user adjusts the weight coefficient, the color reproduction characteristics near an important color such as a flesh color can be improved while observing the influence on surrounding colors.

As another weight coefficient setting method, for example, a weight coefficient may be automatically set like $w_x = 1/\sqrt{(a^2 + b^2)}$ in accordance with the saturation of an edit color. As can be seen from CIE Δ E94 formula, since the human visual sense becomes insensitive near high saturation, high color reproducibility for low saturation colors is more effective for color reproduction than that for high saturation colors. As described above, since a weight is automatically set, higher color reproducibility is acquired near low saturation, thus obtaining visually more preferable color reproduction.

Replacement of B-Spline Basis Function by Other Piecewise Polynomials in Solid Expression In the description of the third and fourth embodiments, B-spline is used as a basis function in solid expression. However, as basis functions, various other piecewise functions such as rational B-spline, nonuniform rational B-spline, Bezier, Rational Bezier, and the like can be used. Note that the above embodiments have been explained using the most typical B-spline since it is more desirable that the locality of the basis function is present.

Expansion of Solid Expression

In the third and fourth embodiments, solid expression based on RGB three dimensions is used as a color space to be given to each formula. However, as can be easily imagined from the above description, such expression can be easily expanded to a two-dimensional surface expression like xy chromaticity values, or a four-dimensional expression or more like cmyk. For example, RGB values can be calculated from xy chromaticity values by:

$$\begin{bmatrix} R \\ G \\ B \end{bmatrix} = \sum_i \sum_j C_{ij} N_{xi}(x) N_{yj}(y) \quad (25)$$

Or xy chromaticity values can be calculated from CMYK values by:

$$\begin{bmatrix} x \\ y \end{bmatrix} = \sum_i \sum_j \sum_k \sum_l C_{ijkl} N_{ci}(c) N_{mj}(m) N_{yk}(y) N_{bkl}(bk) \quad (26)$$

As can be seen from the above formulas, the multiplicity of the summation calculations must be equal to the number of dimensions of the color space to be given to each formula, i.e., that of input color signal values.

In order to calculate coefficients in the summation formulas, matrix formulas must be changed upon expansion of the solid expression. For example, upon calculating from xy chromaticity values in case of two-dimensional surface expression, a matrix M and vector f of matrix formulas for an R value coefficient must be defined by:

$$m_{st} = \Sigma_a N_{xi}(x_a) N_{yj}(y_a) N_{xl}(x_a) N_{ym}(y_a)$$

$$fr_s = \Sigma_a N_{xi}(x_a) N_{yj}(y_a) \cdot r_a \quad (27)$$

Note that s=5(i−1)+j for s between i and j, and t=5(l−1)+m for t between l and m when the number of knots is 5.

For four-dimensional expression like cmyk, a matrix M and vector f of matrix formulas for an x value coefficient must be defined by:

$$m_{st} = \Sigma_a \{N_{ci}(c_a) N_{mj}(m_a) N_{yk}(y_a) N_{bkl}(bk_a) \cdot N_{co}(c_a) N_{mp}(m_a) N_{yq}(y_a) N_{bkr}(bk_a)\}$$

$$fx_s = \Sigma_a N_{ci}(c_a) N_{mj}(m_a) N_{yk}(y_a) N_{bkl}(bk_a) \cdot x_a \quad (28)$$

Note that s=125(i−1)+25(j−1)+5(k−1)+l for s among i, j, k, and l and t=125(o−1)+25(p−1)+5(q−1)+r for t among o, p, q, and r when the number of knots is 5.

Of course, when the number of dimensions becomes 5 or more, the matrix formulas must be similarly modified.

Color Space Used

In the third and fourth embodiments, the color spaces to be used are not particularly limited, and the CMYK color space, L*a*b* color space, JCH color space, XYZ color space, xy color space, and the like can be used. Furthermore, the present invention can be applied to ink color separation, and a six-dimensional color space obtained by adding light cyan and light magenta to CMYK or the like can be used. Furthermore, a color space to be given to each formula may be the same as that to be calculated using that formula.

Fifth Embodiment

A color process according to the fifth embodiment of the present invention will be described below. Note that the same reference numerals in the fifth embodiment denote the same components as those in the first to fourth embodiments, and a detailed description thereof will be omitted.

[Arrangement and Operation]

Figure 24:
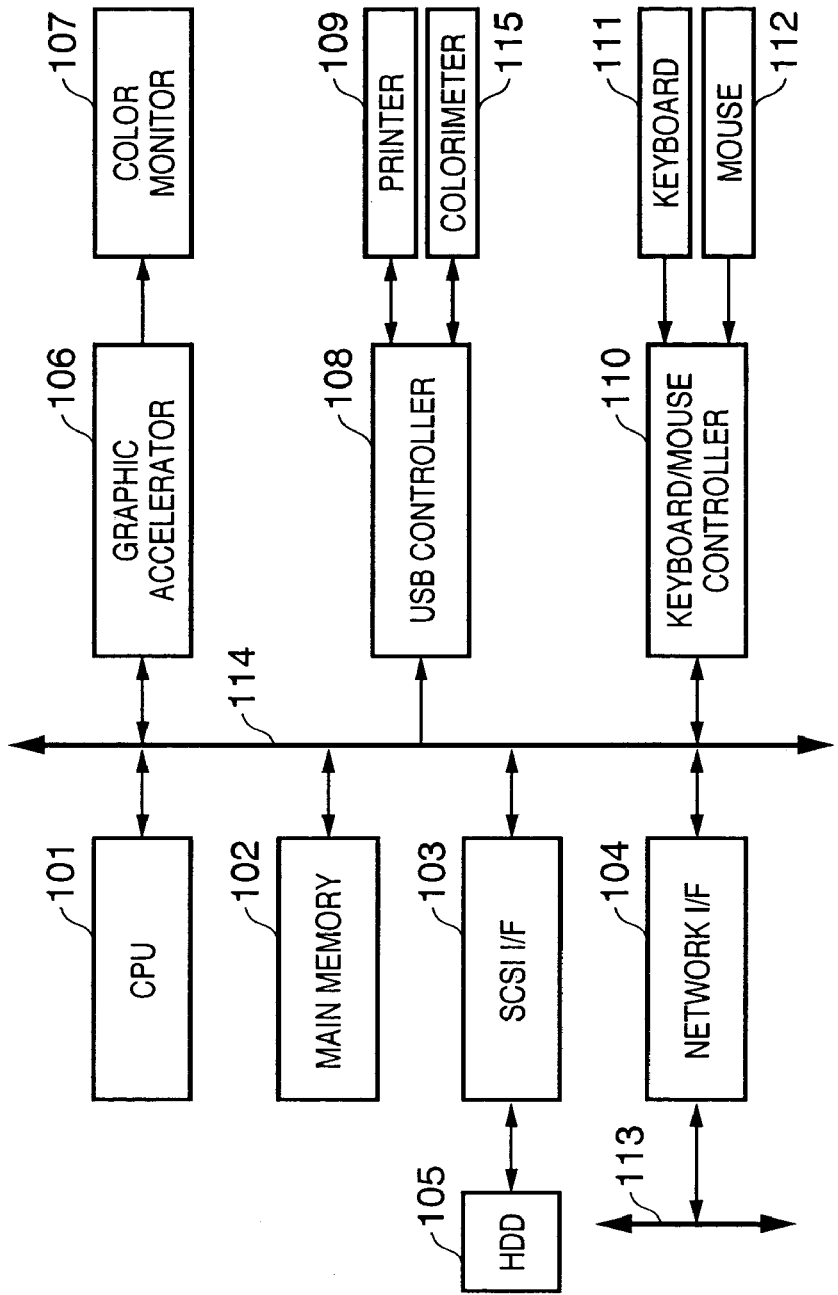
FIG. 24 is a block diagram showing the arrangement of a color processing apparatus of the fifth embodiment.

FIG. 24 is a block diagram showing the arrangement of a color processing apparatus of the fifth embodiment. The difference from the color processing apparatus shown in FIG. 3 is that the apparatus of this embodiment has a colorimeter 15.

With the above arrangement, a series of operations for printing color patches, predicting L*a*b* values for RGB values on the basis of colorimetry results of the color patches, and creating a profile will be described below.

A profile creation application stored in the HDD 105 is launched in response to a command from the CPU 101. This profile creation application displays a user interface shown in FIG. 25 on the color monitor 107.

Figure 25:
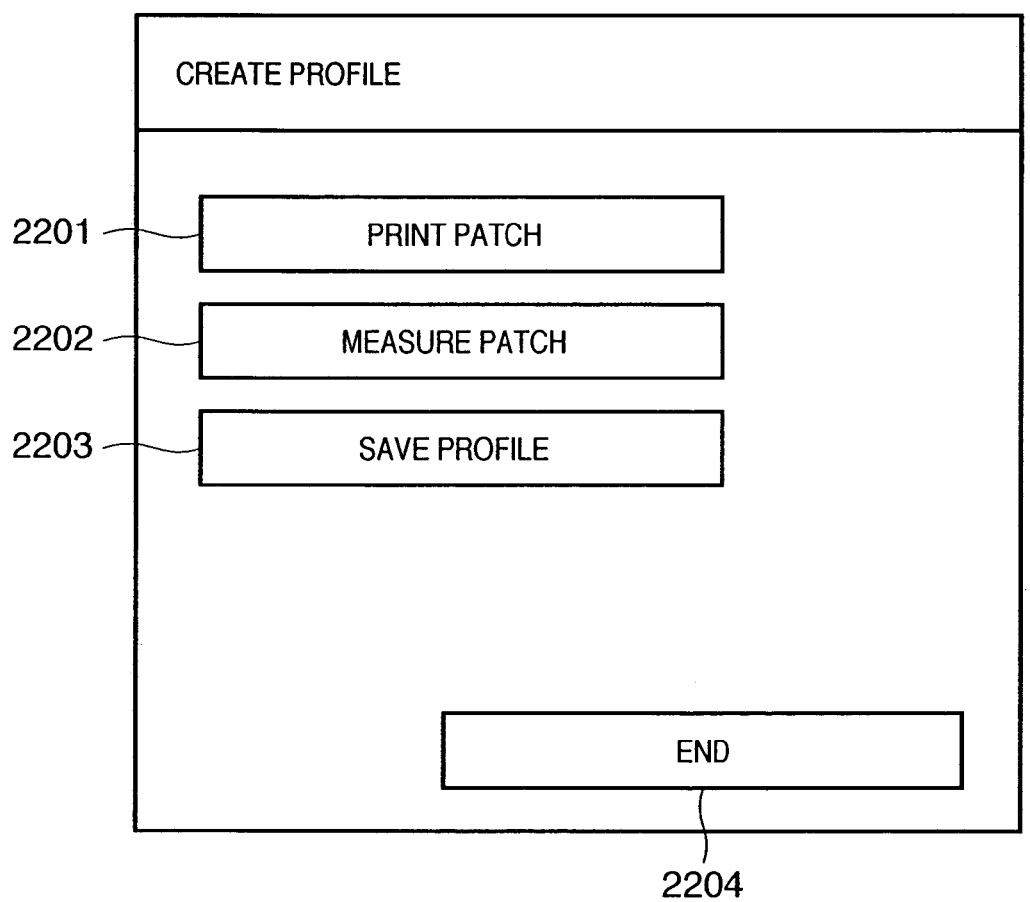
FIG. 25 shows a user interface displayed by a profile creation application.

The user interface shown in FIG. 25 includes a patch print button 2201 that allows the user to issue a print instruction of color patches, a patch colorimetry button 2202 that allows the user to issue a colorimetry instruction of the color patches, a profile save button 2203 used to save a profile, and an end button 2204 used to end the profile creation application.

When the user presses the patch print button 2201, the profile creation application controls the printer 109 to print a patch image. Next, when the user sets a patch image at an appropriate position of the colorimeter 115 and then presses the colorimetry button 2202, the profile creation application stores spectral reflectance data of the color patches measured by the calorimeter 115 in the main memory 102 via the USB controller 108.

The profile creation application converts the spectral reflectance data of the color patches stored in the main memory 102 into L*a*b* values, and stores the converted L*a*b* values in the main memory 102 in combination with RGB values. FIG. 26 shows an example of the data format as combinations of L*a*b* values of colorimetry data and RGB values. After that, the profile creation application enables the profile save button 2203 (to allow the user press it). After the profile save button 2203 is enabled, when the user presses that button, a profile of the printer 109 is created in a sequence to be described later.

When the user presses the end button 2204, the profile creation application ends the process, and clears the work memory areas and application memory areas of the main memory 102.

[Profile Creation Operation]

Figure 27:
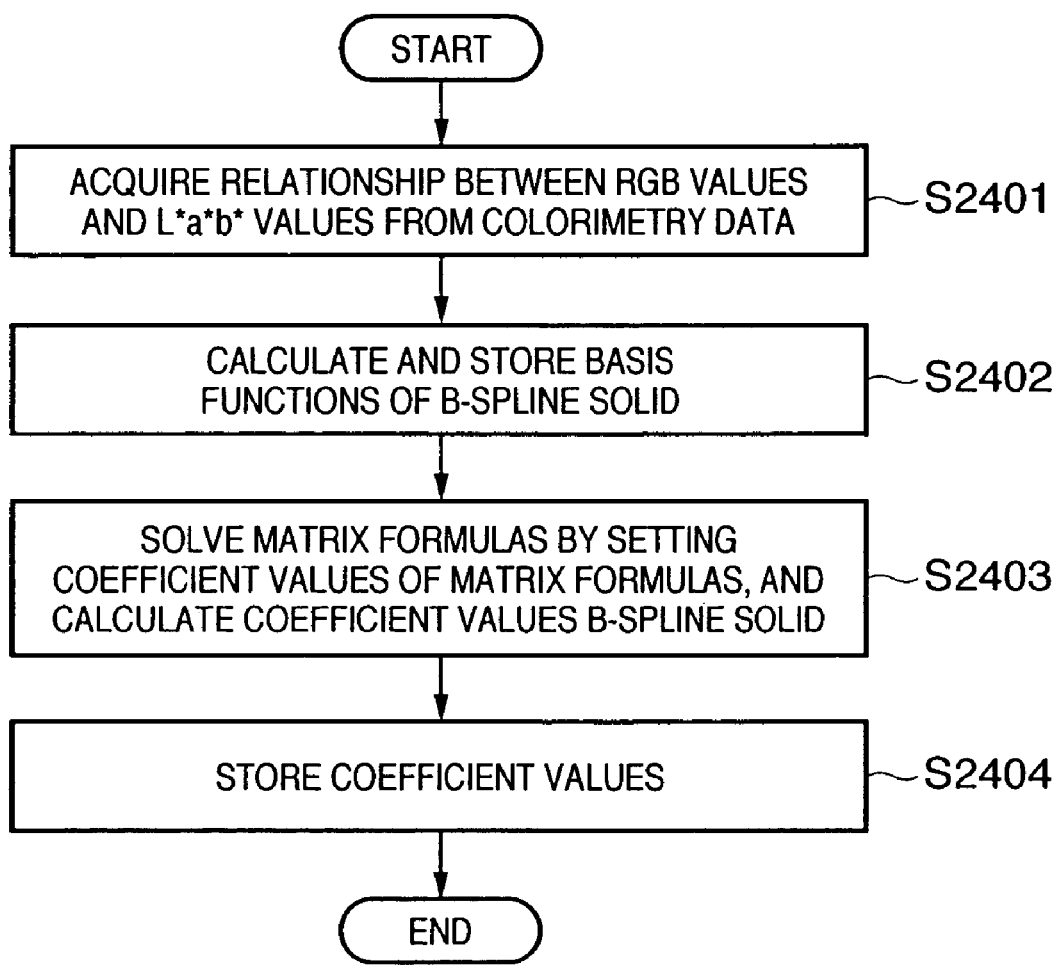
FIG. 27 is a flowchart for explaining a calculation process of coefficients and basis functions of a color prediction B-spline solid.

FIG. 27 is a flowchart showing the process for calculating the coefficients and basis functions of a color prediction B-spline solid. Note that the color prediction B-spline solid is expressed by formulas (13) above.

The correspondence between the RGB values and L*a*b* values is acquired for all sets from the colorimetry data expressed by the data structure shown in FIG. 26 (S2401). As the correspondence between the RGB values and L*a*b* values, i-th RGB values=$rr_i$, $gg_i$, and $bb_i$, and i-th L*a*b* values=$\lambda_i$, $a_i$, and $b_i$ will be used.

Next, the number of knots for the total number $n^3$ of data (total number of patches) of colorimetry data is n−1, and basis functions are calculated based on knots and are stored in the main memory (S2402). In the example shown in FIG. 26, since the number of patches is 125, the number of knots is 4. The calculations of the basis functions after the knots are determined use a general DeBoor-Cox algorithm, as described in the first embodiment. The basis function will be explained as a B-spline basis of degree 3 having four knots hereinafter.

Using the calculated basis functions and corresponding data indicating the correspondence between the RGB values and L*a*b* values acquired from the colorimetry data shown in FIG. 26, a matrix formula f=MC is solved using LUT decomposition for each of λ*, a*, and b* components to calculate coefficients of the B-spline solid (S2403). Coefficient calculations using the formulas will be described in detail below.

A component $m_{st}$ at the s-th row and t-th column of a matrix M is calculated by:

$$m_{st} = N_{ri}(rr_s) N_{gj}(gg) N_{bk}(bb_s) \quad (29)$$

for t=25(i−1)+5(j−1)+k where i, j, and k are integers ranging from 1 to 5.

Note that the relationship between t and i, j, and k changes depending on the number of knots and the degree of the basis function. For example, in case of the B-spline basis of degree 3 having six knots, we have t=49(i−1)+7(j−1)+k.

Calculations of the coefficients $c\lambda_{ijk}$, $ca_{ijk}$, and $cb_{ijk}$ will be described below. In order to calculate the coefficient $c\lambda_{ijk}$, the following matrix formulas are solved using LUT decomposition:

$$f\lambda = [\lambda_1, \lambda_2, \ldots, \lambda_{124}, \lambda_{125}]$$

$$c\lambda = [c\lambda_{111}, c\lambda_{112}, \ldots, c\lambda_{115}, c\lambda_{121}, \ldots c\lambda_{155}, c\lambda_{211}, \ldots, c\lambda_{554}, c\lambda_{555}]$$

$$f\lambda = M \cdot c\lambda \quad (30)$$

In order to calculate the coefficient $ca_{ijk}$, the following matrix formulas are solved using LUT decomposition:

$$fa = [a_1, a_2, \ldots, a_{124}, a_{125}]$$

$$ca = [ca_{111}, ca_{112}, \ldots, ca_{115}, ca_{121}, \ldots ca_{155}, ca_{211}, \ldots, ca_{554}, ca_{555}]$$

$$fa = M \cdot ca \quad (31)$$

In order to calculate the coefficient $cb_{ijk}$, the following matrix formulas are solved using LUT decomposition:

$$fb = [b_1, b_2, \ldots, b_{124}, b_{125}]$$

$$cb = [cb_{111}, cb_{112}, \ldots, cb_{115}, cb_{121}, \ldots cb_{155}, cb_{211}, \ldots, cb_{554}, cb_{555}]$$

$$fb = M \cdot cb \quad (32)$$

The calculated coefficients are stored in the main memory 102 (S2404).

Figure 28:
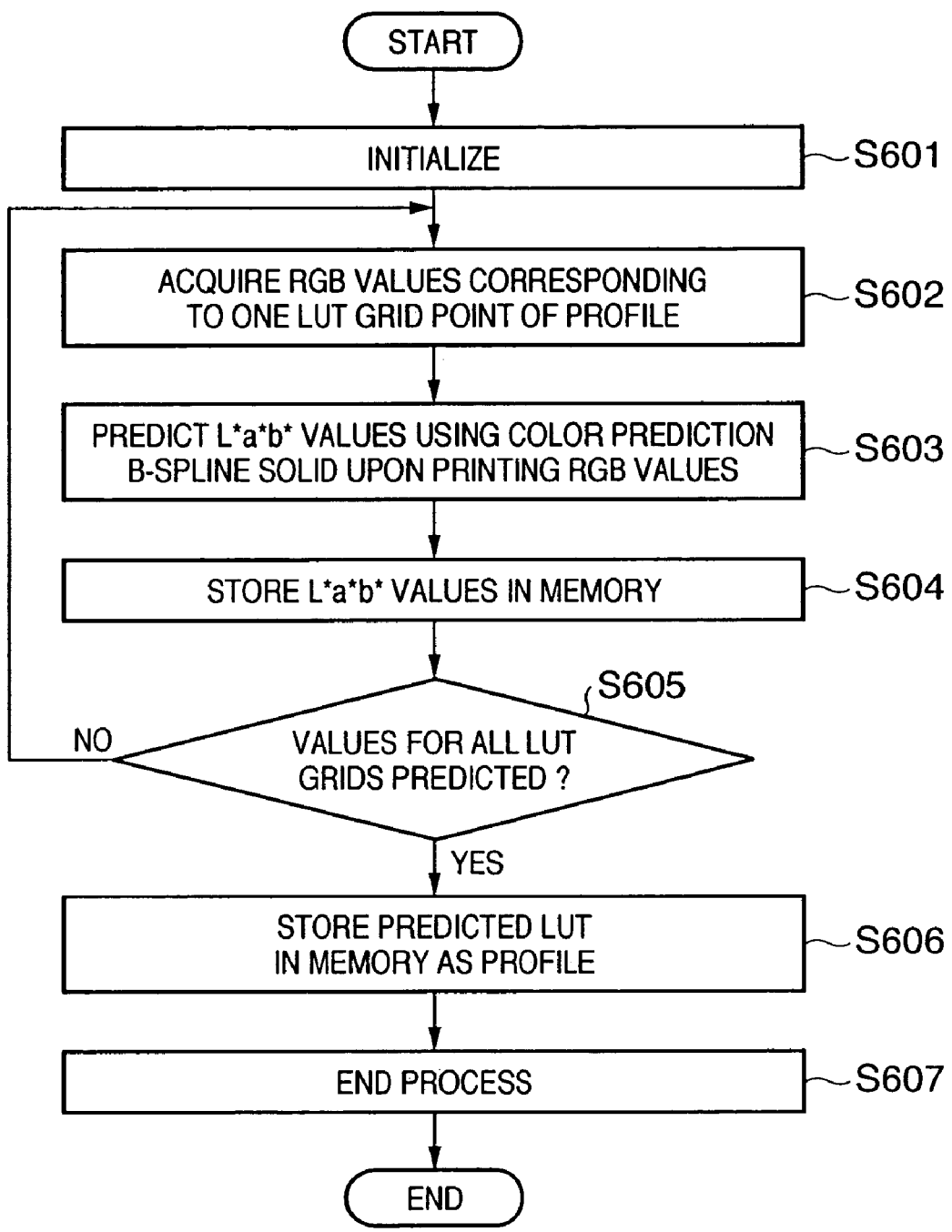
FIG. 28 is a flowchart for explaining a process for creating a profile by predicting reproduction colors using the color prediction B-spline solid.

FIG. 28 is a flowchart for explaining a process for predicting reproduction colors using the color prediction B-spline solid and creating a profile.

An initialization operation (e.g., for assuring a work memory area, initializing variables, and the like) is performed (S601). RGB values corresponding to one LUT grid point of the profile are acquired according to an appropriate order (S602). The basis functions and coefficient values of the color prediction B-split solid are acquired from the main memory 102, and a color to be obtained upon printing a color given by RGB values is predicted as L*a*b* values (S603) using:

$$\lambda = \Sigma_{i=1}^{5} \Sigma_{j=1}^{5} \Sigma_{k=1}^{5} c\lambda_{ijk} N_{ri}(rr) N_{gj}(gg) N_{bk}(bb)$$

$$a = \Sigma_{i=1}^{5} \Sigma_{j=1}^{5} \Sigma_{k=1}^{5} ca_{ijk} N_{ri}(rr) N_{gj}(gg) N_{bk}(bb) \quad (33)$$

$$b = \Sigma_{i=1}^{5} \Sigma_{j=1}^{5} \Sigma_{k=1}^{5} cb_{ijk} N_{ri}(rr) N_{gj}(gg) N_{bk}(bb)$$

where rr, gg, and bb are RGB values, $\lambda$, a, and b are L*a*b* values, $N_r$ is the basis function in the R-axis direction, $N_g$ is the basis function in the G-axis direction, and $N_b$ is the basis function in the B-axis direction, $c\lambda_{ijk}$, $ca_{ijk}$, and $cb_{ijk}$ are coefficients, and suffixes i, j, and k appended to $N_r$, $N_g$, and $N_b$ are respectively the basis function numbers in bases for respective axes.

The predicted L*a*b* values are stored at a memory address (main memory 102) corresponding to the LUT grid point position (S604). It is checked if all LUT grid points are predicted (S605). Steps S602 to S604 are repeated until all LUT grid points are predicted.

After all LUT grid points are predicted, the converted LUT data stored in the main memory 102 are stored as profile data in a predetermined area of the main memory 102 (S606), and an end operation (for, e.g., releasing a work memory and the like) is done (S607), thus ending the profile creation process.

FIG. 29 shows the data structure of the profile, which describes correspondence between the color coordinates of grid points of the RGB color space, and coordinate values of the L*a*b* color space reproduced by the grid points. The profile describes steps of R/G/B values at the beginning, and then describes L*a*b* color coordinates which are nested in the order of R, G, and B.

In this way, by applying the B-spline that can be used to calculate colors with a smooth change by naturally reflecting the trend of value changes, precise color prediction can be implemented even by a small number of measured color patches.

Modification of Embodiment

Replacement of B-Spline Basis Function by Other Piecewise Polynomials in Solid Expression In the description of the fifth embodiment, B-spline is used as a basis function in solid expression. However, as basis functions, various other piecewise functions such as rational B-spline, nonuniform rational B-spline, Bezier, Rational Bezier, and the like can be used.

Number of Knots of Each Basis in Solid Expression

In the description of the fifth embodiment, the number of knots of each basis is the same. However, the number of knots for each basis can be changed.

Number of Dimensions of Color to be Predicted

In the fifth embodiment, the physical stimulus values of the L*a*b* three-dimensional color space are predicted from the RGB three-dimensional color space. However, the number of dimensions of colors to be predicted is not particularly limited.

Expansion of Solid Expression

In the fifth embodiment, solid expression of the RGB three-dimensional color space is used as a color space of the prediction source. However, the number of dimensions of this color space of the prediction source is not particularly limited.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priorities from Japanese Patent Applications No. 2003-416616 filed on Dec. 15, 2003 and No. 2004-264598 filed on Sep. 10, 2004 which are hereby incorporated by reference herein.

What is claimed is:

1. A color processing method of calculating output color signal values of a second colorimetric system from input color signal values expressed by a first colorimetric system, the method comprising the steps of:

obtaining correspondence between color signal values of the first colorimetric system and color signal values of the second colorimetric system;

calculating basis functions corresponding to a plurality of color components composing the first colorimetric system from the correspondence, wherein the basis functions are piecewise polynomials and concern a plurality of color components composing the second colorimetric system; and calculating the output color signal values of the second colorimetric system from the input color signal values of the first colorimetric system using multiple summation calculations including as basis functions the piecewise polynomials having the same multiplicity as the number of dimensions of the first colorimetric system.

2. The method according to claim 1, wherein the basis function is one of B-spline, rational B-spline, nonuniform rational B-spline, Bézier, and Rational Bézier.

3. The method according to claim 1, wherein respective summation terms in the summation calculations have the same numbers of summation calculations.

4. The method according to claim 1, wherein at least one of respective summation terms in the summation calculations has a different number of summation calculations from another of the summation terms.

5. The method according to claim 1, further comprising the steps of:
inputting image data representing an image;
calculating basis function values of the multiple summation calculations defined on respective dimensions of the first colorimetric system from values of respective dimensions of the first colorimetric system;
calculating the output color signal values of the second colorimetric system by the multiple summation calculations using the calculated including as basis function values functions the piecewise polynomials; and
performing a display of a preview image based on the output color signal values of the second colorimetric system.

6. The method according to claim 1, further comprising the steps of:
changing the coffespondence in accordance with user designation;
applying conversion to color signal values expressed by the first colorimetric system;
calculating basis function values of the multiple summation calculations defined on fundamental axes of a space of the converted color signal values from the converted color signal values; and
calculating performing the calculation of the output color signal values of the second colorimetric system by the multiple summation calculations using and the calculation of the calculated basis function values functions based on the changed correspondence.

7. The method according to claim 1, further comprising the steps of:
obtaining input color signal values of the first colorimetric system corresponding to grid points of a lookup table;
calculating wherein coefficients of the multiple summation calculations are calculated from combinations that specify output color signal values of to be calculated expressed by the second colorimetric system in coffespondence with a plurality of from the input color signal values coffesponding to expressed by the first colorimetric system grid points; and
storing the calculated output color signal values to the corresponding grid points of the lookup table to generate the lookup table.

8. The method according to claim 1, further comprising the steps of:
applying the conversion to a plurality of color signal values expressed by the first colorimetric system in combinations that specify color signal values to be calculated expressed by the second colorimetric system in correspondence with a plurality of signal values expressed by the first colorimetric system;
weighting the correspondence; and
calculating coefficients of used in the multiple summation calculations from the weighted correspondence and combinations of the converted color signal values basis functions.

9. The method according to claim 8, wherein the coefficients of the multiple summation calculations have dimensions corresponding to the second colorimetric system.

10. The method according to claim 8, wherein each dimension of the second colorimetric system has a combination of summation scalar coefficients, and a summation calculation is made for each dimension of the second colorimetric system upon calculating color signal values of the second colorimetric system.

11. A computer-readable medium storing a program comprising program code for causing a computer to perform for a color processing method of calculating output color signal values of a second colorimetric system from input color signal values expressed by a first colorimetric system, the method comprising the steps of:
obtaining correspondence between color signal values of the first colorimetric system and color signal values of the second colorimetric system;
calculating basis functions corresponding to a plurality of color components composing the first colorimetric system from the coffespondence, wherein the basis functions are piecewise polynomials and concern a plurality of color components composing the second colorimetric system; and
calculating the output color signal values of the second colorimetric system from the input color signal values of the first colorimetric system using multiple summation calculations including as basis functions the piecewise polynomials having the same multiplicity as the number of dimensions of the first colorimetric system.

12. A color processing apparatus for calculating output color signal values of a second colorimetric system from input color signal values expressed by a first colorimetric system, comprising:
an obtaining section, arranged to obtain correspondence between color signal values of the first colorimetric system and color signal values of the second colorimetric system;
a first calculator, arranged to calculate basis functions corresponding to a plurality of color components composing the first colorimetric system from the correspondence, wherein the basis functions are piecewise polynomials and concern a plurality of color components composing the second colorimetric system; and
a second calculator, arranged to calculate the output color signal values of the second colorimetric system form the input color signal values of the first colorimetric system using multiple summation calculations including as basis functions the piecewise polynomials having the same multiplicity as the number of dimensions of the first colorimetric system.

13. The apparatus according to claim 12, further comprising a changer arranged to change the coffespondence in accordance with user designation,
wherein said first calculator performs the calculation of the basis functions and said second calculator performs the calculation of the output color signal values of the second colorimetric system, based on the changed correspondence.

14. The apparatus according to claim 12, further comprising a coefficient calculator arranged to weight the correspondence, and to calculate coefficients used in the multiple summation calculations from the weighted correspondence and the basis functions.

* * * * *